(12) United States Patent
Seaver et al.

(10) Patent No.: US 11,640,604 B2
(45) Date of Patent: May 2, 2023

(54) AUTOMATED BLOCKCHAIN ADDRESS CREATION AND TRANSFERS BY UNIFORM RESOURCE LOCATOR GENERATION AND EXECUTION

(71) Applicants: Jesse Thomas Seaver, Stamford, CT (US); Sacha Tueni, Stamford, CT (US); Noah Thorp, Stamford, CT (US); Michael Reeder, Stamford, CT (US)

(72) Inventors: Jesse Thomas Seaver, Stamford, CT (US); Sacha Tueni, Stamford, CT (US); Noah Thorp, Stamford, CT (US); Michael Reeder, Stamford, CT (US)

(73) Assignee: WALY CASH INC., Stamford, CT (US)

( * ) Notice: Subject to any disclaimer, the term of this patent is extended or adjusted under 35 U.S.C. 154(b) by 0 days.

(21) Appl. No.: 17/772,146

(22) PCT Filed: Dec. 10, 2021

(86) PCT No.: PCT/US2021/062736
§ 371 (c)(1),
(2) Date: Apr. 27, 2022

(87) PCT Pub. No.: WO2022/125851
PCT Pub. Date: Jun. 16, 2022

(65) Prior Publication Data
US 2022/0351198 A1 Nov. 3, 2022

Related U.S. Application Data

(60) Provisional application No. 63/249,228, filed on Sep. 28, 2021, provisional application No. 63/124,121, filed on Dec. 11, 2020.

(51) Int. Cl.
*G06Q 20/38* (2012.01)
*G06Q 20/40* (2012.01)
(Continued)

(52) U.S. Cl.
CPC ....... *G06Q 20/3825* (2013.01); *G06Q 20/401* (2013.01); *H04L 9/50* (2022.05); *G06K 7/1417* (2013.01); *G06Q 2220/00* (2013.01)

(58) Field of Classification Search
CPC ............. G06Q 20/3825; G06Q 20/401; G06Q 2220/00; H04L 9/50; G06K 7/1417
(Continued)

(56) References Cited

U.S. PATENT DOCUMENTS

2015/0262137 A1 9/2015 Armstrong
2016/0162897 A1 6/2016 Feeney
(Continued)

OTHER PUBLICATIONS

Basuki et al. "Joint Transaction-Image Steganography for High Capacity Covert Communication", 2019 International Conference on Computer, Control, Informatics and its Applications, IEEE, Nov. 23, 2019, pp. 41-46 (Year: 2019).*

(Continued)

*Primary Examiner* — James D Nigh
(74) *Attorney, Agent, or Firm* — Leydig, Voit & Mayer, Ltd.

(57) ABSTRACT

A method for performing a transfer using a blockchain network and a uniform resource locator (URL) includes receiving, by computer program code which is stored on the blockchain network, an address on the blockchain network and tokens or value associated therewith the address for writing a blockchain transaction. The URL is associated with the address and includes key parameters thereof. The computer program code receives, as an automated result of execution of the URL, a cryptographically signed transaction having the key parameters of the address and key parameters of a new address that were generated by the execution of the URL. The computer program code transfers, based on the blockchain network reaching consensus (Continued)

on the transaction, at least part of the tokens or value from the address to the new address as a further automated result of the execution of the URL.

15 Claims, 10 Drawing Sheets

(51) Int. Cl.
*H04L 9/00* (2022.01)
*G06K 7/14* (2006.01)
*G06Q 20/36* (2012.01)
*H04L 9/32* (2006.01)
*G06Q 20/06* (2012.01)

(58) Field of Classification Search
USPC .......................................................... 705/75
See application file for complete search history.

(56) References Cited

U.S. PATENT DOCUMENTS

| | | |
|---|---|---|
| 2016/0342989 A1 | 11/2016 | Davis |
| 2017/0046689 A1 | 2/2017 | Lohe et al. |
| 2017/0317833 A1 | 11/2017 | Smith et al. |
| 2019/0180311 A1* | 6/2019 | Chan .................. G06Q 30/0239 |
| 2020/0294033 A1* | 9/2020 | Wilson ............... G06Q 20/0658 |

OTHER PUBLICATIONS

Ferreira, Micaela et al.; "Blockchain: A Tale of Two Applications"; Applied Sciences; Sep. 1, 2018; pp. 1-24; vol. 8, No. 1506; Multidisciplinary Digital Publishing Institute (MDPI); Basel, Switzerland.

* cited by examiner

AUTOMATED BLOCKCHAIN ADDRESS CREATION AND TRANSFERS BY UNIFORM RESOURCE LOCATOR GENERATION AND EXECUTION

CROSS-REFERENCE TO PRIOR APPLICATIONS

This application is a U.S. National Phase application under 35 U.S.C. § 371 of International Application No. PCT/US2021/062736, filed on Dec. 10, 2021, and claims benefit to U.S. Provisional Patent Application Nos. 63/124,121, filed on Dec. 11, 2020, and 63/249,228, filed on Sep. 28, 2021.

FIELD

The present invention relates to cryptography and distributed ledger technology, and in particular to blockchain technology and the use of cryptography and computer code to adapt and improve the functionality of blockchain networks.

BACKGROUND

There are an ever-growing number of blockchain networks which each have their own cryptocurrencies, and in some cases do not deal in currency, but for authentication or exchange of other value, such as non-fungible tokens (NFTs). In order to perform transactions among user accounts in the blockchain network, cryptographic protocols are used to ensure that the sending user has the funds in their existing blockchain wallet address to make the transfer, that the funds are transferred to the blockchain wallet address owned by the recipient user without any intervening transactions, and that each node of the blockchain network reaches consensus on transactions being added to the distributed ledger. However, current blockchain networks are limited in their capabilities to perform cross-blockchain network transactions and off-blockchain network transactions, and are especially limited in the case that the parties to a potential transfer do not each already have pre-existing blockchain wallet addresses on the blockchain networks. Current blockchain networks do not provide functionality which would allow an intended recipient of a transaction who does not already have an account on the blockchain network to take part in the blockchain transaction in a manner that will automatically, securely and privately generate funds in a new blockchain address for any recipient, which is not named and/or which does not already have a pre-existing and designated blockchain wallet address. In other words, current blockchain networks do not have the functional capability to provide for a secure transfer when the users are not known or do not have pre-existing blockchain wallet addresses associated thereto. Moreover, different blockchain networks charge fees (e.g., so called gas fees), and may have other requirements such as wrapping and unwrapping the digital currencies, which pose further technical impediments to performing such transfers.

SUMMARY

In an embodiment, the present invention provides a method for performing a transfer using a blockchain network and a uniform resource locator (URL). Computer program code which is stored on the blockchain network receives an address on the blockchain network and tokens or value associated with the address for writing a blockchain transaction using the computer program code. The URL is associated with the address and includes key parameters of the address. The computer program code receives as an automated result of execution of the URL, a cryptographically signed transaction having the key parameters of the address and key parameters of a new address on the blockchain network that were generated by the execution of the URL to which at least part of the tokens or value is to be sent. The computer program code transfers, based on the blockchain network reaching consensus on the cryptographically signed transaction, the at least part of the tokens or value from the address to the new address as a further automated result of the execution of the URL.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
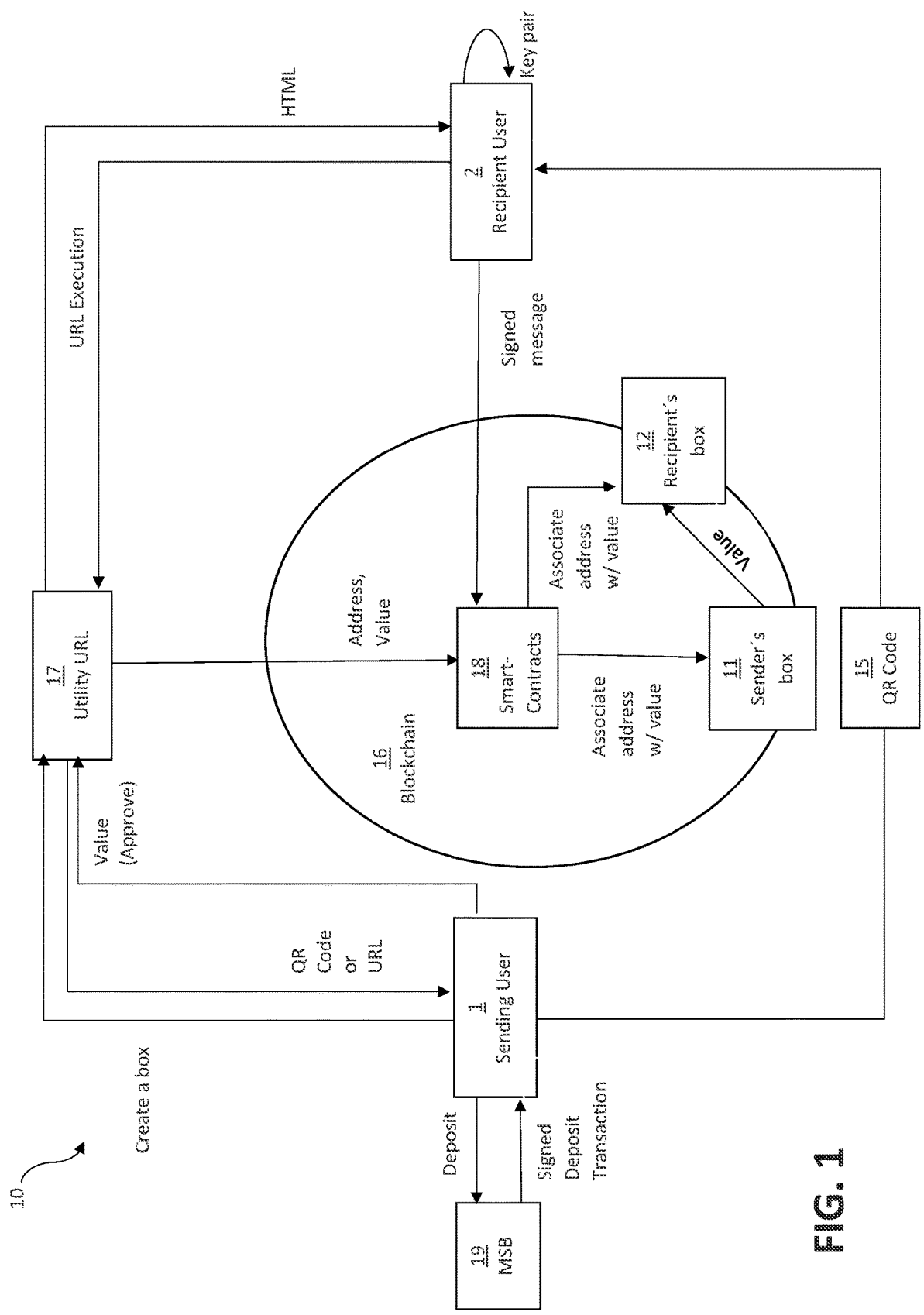
FIG. 1 schematically shows a method and system for URL-based blockchain transfers according to an embodiment of the present invention.
Figure 2A:
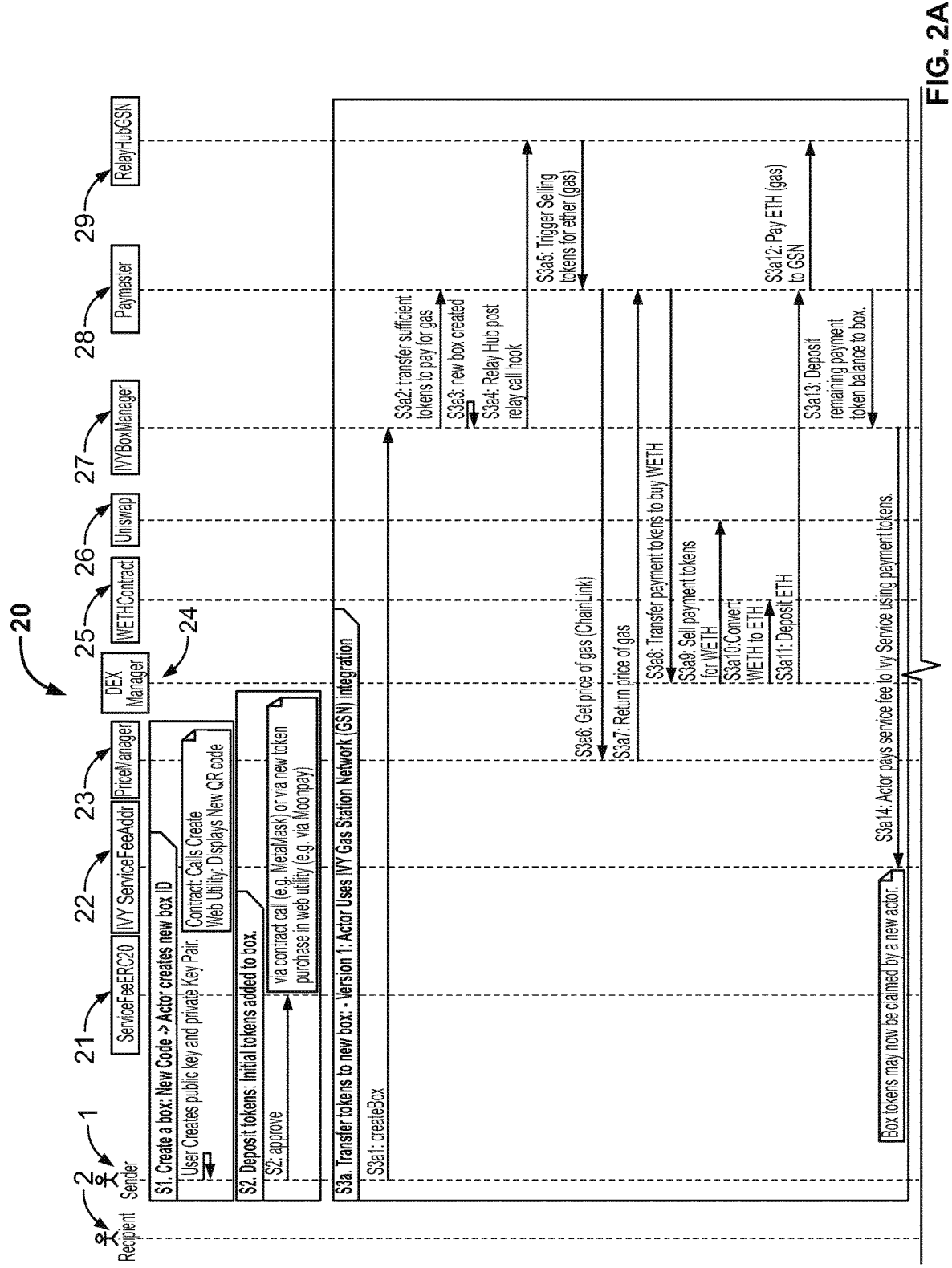
FIGS. 2A-2D are a unified modeling language (UML) diagram showing the calls and interaction among the computer programs and utilities according to embodiments of the present invention.
Figure 2B:
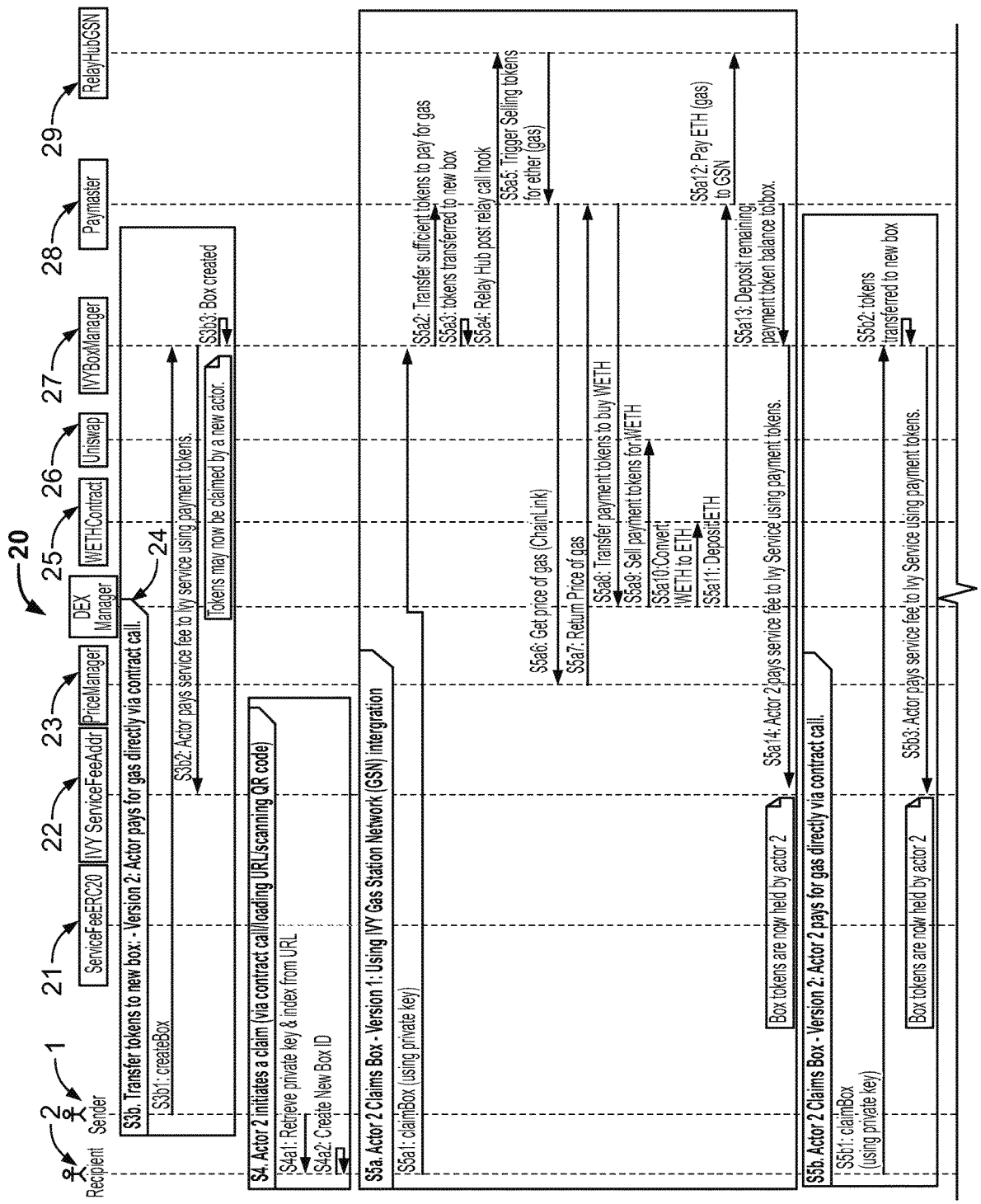
Figure 2C:
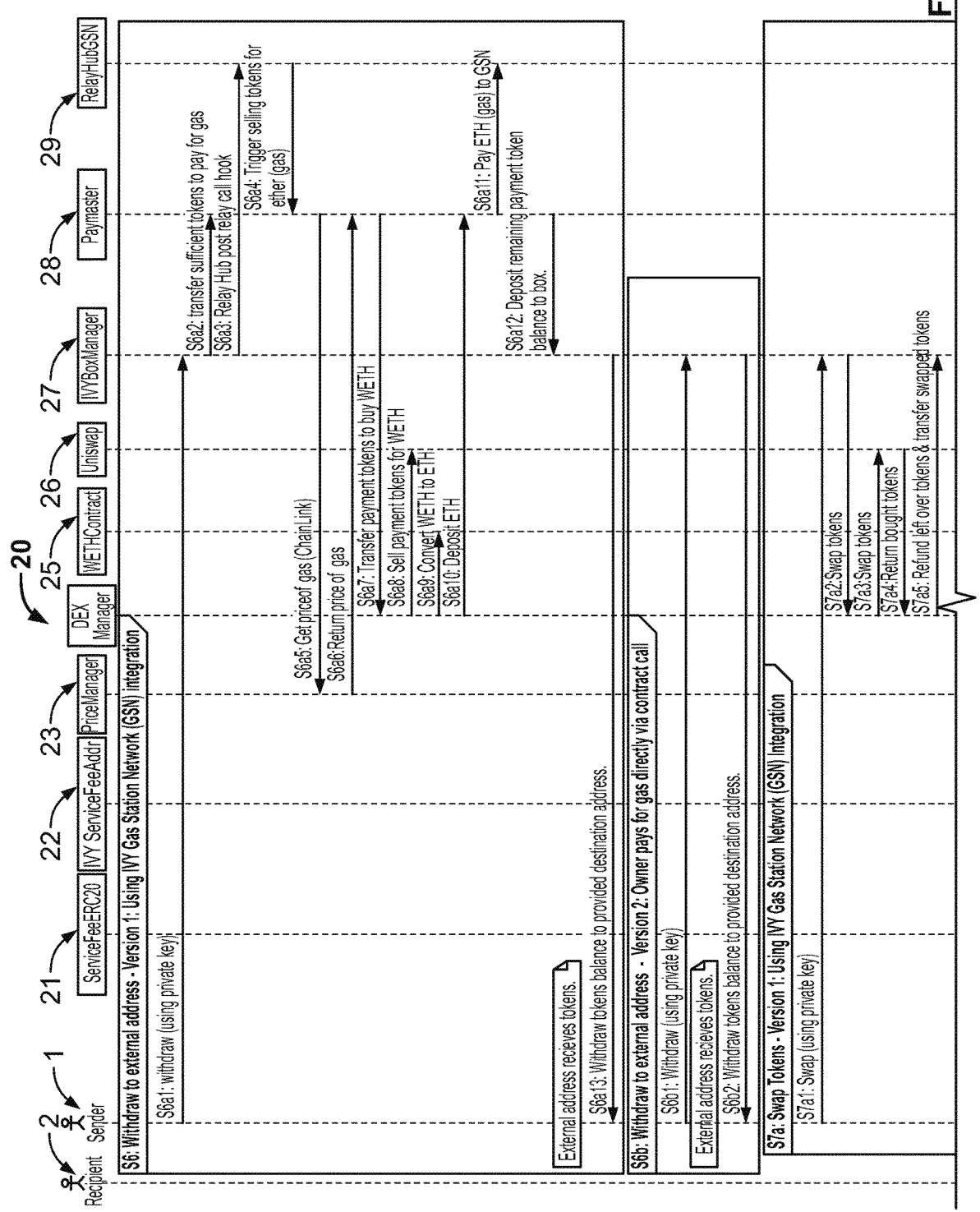
Figure 2D:
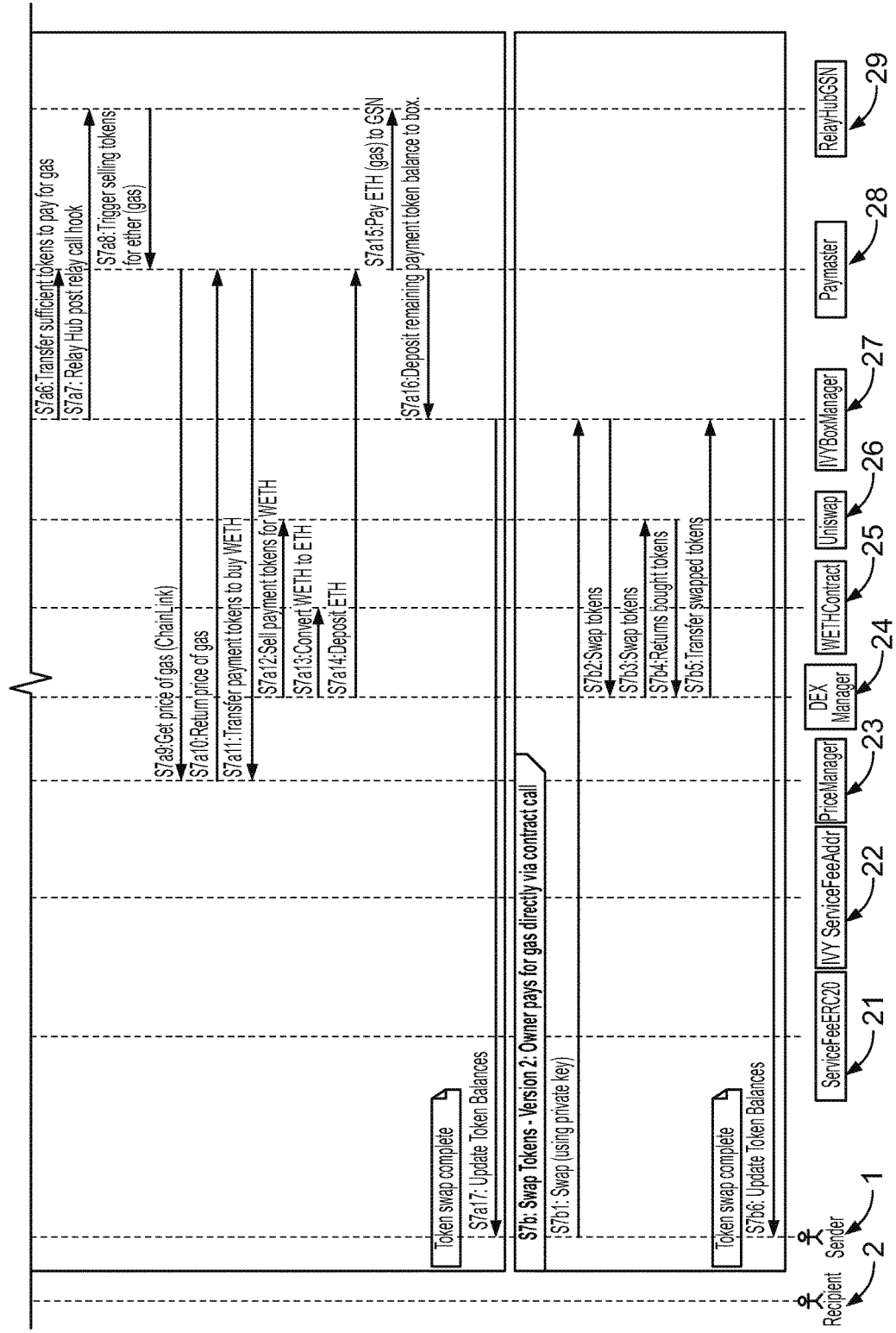

Embodiments of the present invention provide to adapt traditional blockchain networks to improve their functionality by adding the ability for users (including individuals and/or entities represented by computing devices) that do not have accounts or blockchain wallets on the blockchain network to engage in a transaction with any other user or entity in a simple, secure and private manner, thereby enhancing the capabilities and flexibility of the blockchain network. Moreover, by adapting the blockchain network to automatically move tokens or other value exchangeable via a block chain network between user boxes by the execution of a unique uniform resource locator (URL) sent from a sending user to a recipient user, embodiments of the present invention enable to use the blockchain network for transactions in a fast, safe, secure and verifiable manner, as well as providing for automatically, cryptographically signing the transaction upon the URL execution. In particular, the transfers are nearly instantaneous upon execution of the URL and ensure both that the sender has and will have sufficient tokens, and that the recipient will be able to privately claim the value and use it flexibly. In particular, in contrast to existing technologies, a blockchain account address (also referred to herein as a box) is automatically generated for the recipient user upon execution of the URL, and the tokens or value are also automatically moved from the sending user's box to the recipient user's box, and it is not required for the recipient user to do anything other than execute the URL to generate and thereafter have an account on the blockchain network. Embodiments of the present invention also allow for completely private transactions, since the URLs and the key parameters included therein can be solely associated with addresses on the blockchain and not in any way with particular users. Embodiments of the present invention further provide to flexibly be able to adapt a number of different blockchain networks. For example, embodiments of the present invention further provide to adapt blockchain networks in order to account for so-called "gas fees" which act as a technical impediment to implementing near-instantaneous transfers without preexisting accounts on the blockchain.

As used herein, the terms "blockchain" or "distributed ledger" refer to a shared list of digital records (ledger) on a blockchain network (comprising computing entities acting as blockchain nodes) that are cryptographically linked, wherein consensus among the computing nodes on the correctness of the ledger or a new transaction is required before entries can be added to the ledger. In most blockchain networks, each of the computing nodes stores and updates a copy of the ledger in physical memory. A transaction on the blockchain network can relate to a transfer of money, digital currency (cryptocurrency), tokens, non-fungible tokens (NFTs) or other data or objects (value) which can be exchanged using a blockchain network. As used herein, the term "smartcontract" (or "smart contract" or "smart-contract") refers to a computer program (code) that is stored on the blockchain network and adapts and/or supplements computer program code which controls the blockchain network such that specialized functions, such as those described herein with respect to different, particular smartcontracts, can be implemented by the blockchain network. This code is usually available (i.e., can be inspected) to all the computing nodes that are part of the blockchain network.

According to an Aspect 1, the present invention provides the present invention provides a method for performing a transfer using a blockchain network and a uniform resource locator (URL). Computer program code which is stored on the blockchain network receives an address on the blockchain network and tokens or value associated with the address for writing a blockchain transaction using the computer program code. The URL is associated with the address and includes key parameters of the address. The computer program code receives as an automated result of execution of the URL, a cryptographically signed transaction having the key parameters of the address and key parameters of a new address on the blockchain network that were generated by the execution of the URL to which at least part of the tokens or value is to be sent. The computer program code transfers, based on the blockchain network reaching consensus on the cryptographically signed transaction, the at least part of the tokens or value from the address to the new address as a further automated result of the execution of the URL.

According to an Aspect 2, the present invention provides the method according to Aspect 1, wherein the computer program code calculates an amount of costs or fees required for the transfer, and sends the costs or fees from the tokens or value to corresponding accounts prior to performing the blockchain transaction that associates the remaining tokens or values to the address.

According to an Aspect 3, the present invention provides the method according to Aspects 1 or 2, wherein the costs or fees include a gas fee, and wherein the computer program code connects to a utility for obtaining an amount of the gas fees and a gas station network for exchanging part of the tokens or value to cover the gas fee.

According to an Aspect 4, the present invention provides the method according to any of Aspects 1-3, wherein the URL is associated with a QR code, and is executed by a device having a web browser by scanning the QR code.

According to an Aspect 5, the present invention provides the method according to any of Aspects 1-4, wherein a private key of the key parameters that were generated by execution of the URL is used to sign the transaction and remains on the device having the web browser that executes the URL.

According to an Aspect 6, the present invention provides the method according to any of Aspects 1-5, further comprising generating a new URL containing the key parameters of the new address and being associated with the new address upon the execution of the URL.

According to an Aspect 7, the present invention provides the method according to any of Aspects 1-6, further comprising, receiving, by the computer program code upon execution of the new URL, a further cryptographically signed transaction having the key parameters of the new address and key parameters of a further new address on the blockchain network that were generated by the execution of the new URL to which the tokens or value is to be sent, and transferring, by the computer program code and based on the blockchain network reaching consensus on the further cryptographically signed transaction, the tokens or value from the address to the new address as an automated result of the execution of the new URL.

According to an Aspect 8, the present invention provides the method according to any of Aspects 1-7, wherein the computer program code connects to a decentralized exchange and/or another computer program implemented in the blockchain network to wrap and/or unwrap the tokens or value, and/or to exchange for other tokens or value, prior to performing the blockchain transaction that associates the tokens or values to the address and/or prior to transferring the at least part of the tokens or value to the new address.

According to an Aspect 9, the present invention provides the method according to any of Aspects 1-8, further comprising receiving a condition for the transfer, and checking whether the condition has been met prior to transferring the tokens or values to the new address.

According to an Aspect 10, the present invention provides the method according to any of Aspects 1-9, wherein the condition is a proof-of-credential and/or a validity time limit on the URL.

According to an Aspect 11, the present invention provides the method according to any of Aspects 1-10, wherein the URL is linked to computer code which is sent to the device of a user that executed the URL such that the device generates and locally stores the key parameters of the new address, generates a signed message using a private key of the key parameters of the address contained in the URL, generates a signed transaction containing the signed message using a private key of the key parameters of the new address and sends the signed transaction to the computer program code for making the transfer.

According to an Aspect 12, the present invention provides the method according to any of Aspects 1-11, further comprising receiving, by the computer program code, a transaction including key parameters of an address to serve as a dispensary and an amount to transfer from the dispensary upon each execution of the URL, whereby a new address is created using key parameters of a device that executed the URL upon each execution, wherein the amount to transfer is transferred in each case to the new address, and wherein the new addresses are different from each other.

According to an Aspect 13, the present invention provides the method according to any of Aspects 1-12, further comprising receiving, by the computer program code, a transaction including key parameters of an address to serve as a dispensary that is associated with one or more links to mintable tokens, whereby a new address is created using key parameters of a device that executed the URL upon each execution, wherein the computer program code is configured to mint the tokens at the links in each case with a different identifier each time the URL is executed and transfer the minted token in each case to the new address, and wherein the new addresses are different from each other. The tokens here are, e.g., NFTs and the links are, e.g., links to one or more images.

According to an Aspect 14, the present invention provides a system for performing a transfer using a blockchain network and a uniform resource locator (URL). The system comprises one or more hardware processors configured by computer program code which is stored on the blockchain network to: receive an address on the blockchain network and tokens or value associated with the address for writing a blockchain transaction, wherein the URL is associated with the address and includes key parameters of the address; receive, as an automated result of execution of the URL, a cryptographically signed transaction having the key parameters of the address and key parameters of a new address on the blockchain network that were generated by the execution of the URL to which at least part of the tokens or value is to be sent; and transfer, based on the blockchain network reaching consensus on the cryptographically signed transaction, the at least part of the tokens or value from the address to the new address as a further automated result of the execution of the URL.

According to an Aspect 15, the present invention provides a tangible, non-transitory computer-readable medium having computer program code that is available in a blockchain network and which, upon being executed by one or more processors, facilitates execution of the following steps: receiving an address on the blockchain network and tokens or value associated with the address for writing a blockchain transaction, wherein the URL is associated with the address and includes key parameters of the address; receiving, as an automated result of execution of the URL, a cryptographically signed transaction having the key parameters of the address and key parameters of a new address on the blockchain network that were generated by the execution of the URL to which at least part of the tokens or value is to be sent; and transferring, based on the blockchain network reaching consensus on the cryptographically signed transaction, the at least part of the tokens or value from the address to the new address as a further automated result of the execution of the URL.

FIG. 1 schematically shows a method and system 10 for URL-based blockchain transactions using a blockchain network 16 according to an embodiment of the present invention. A sending user 1 can request the Utility URL 17 to create a box on the blockchain network. For example, the Utility URL 17 can use the entropy functions of the ethers.js library to generate new public/private keys, where the public key represents an address on the blockchain network 16, here the sender's box 11. Ethers.js is an industry standard for JavaScript web3 connections. The web3 connection used in an exemplary embodiment of the present invention adapting the Ethereum network is infura which acts as a public gateway into the blockchain network 16. In an embodiment, the function to create a box can be implemented in accordance with the following pseudocode:

```
function createCode (toIndex, claimPublicKey, token, amount)
{ // create a new box entry boxes[toIndex] = new Box(msg.sender,
toIndex, claimPublicKey, token, amount) }
```

Embodiments of the present invention introduce a mechanism referred to herein as the Utility URL 17. The Utility URL 17 is a smartcontract browser-based software mechanism which adapts the capabilities of a blockchain network 16 so that users may initiate and sign a blockchain transaction between two addresses (also referred to herein as boxes). The Utility URL 17 is preferably a website that can be visited by users, but may also be an application residing on user devices, such as a tablet or smartphone. After receiving a request from the sending user 1 and running the create a box function, the Utility URL 17 can then generate and return a URL, which is preferably represented by a Quick Response (QR) code 15. An initiating or sending user 1 can present the QR code 15 (representing the URL) to a recipient user 2, and when the recipient user 2 scans the QR code 15 and loads the URL in the web browser of their computing device, the value is moved from the blockchain wallet address, or sender's box 11, associated with the QR code 15 being held by the sending user 1 to a new blockchain address, or recipient's box 12 now controlled by the recipient user 2. These addresses are controlled and tracked by computer programs 18 (indicated in FIG. 1 as "smartcontracts"), which are public smartcontracts that adapt the functionalities of the blockchain network 16 and are discussed in further detail below.

Thus, when using the Utility URL 17, the sending user 1 can request to create the sender's box 11 on the blockchain network 16. It is also possible that the sending user 1 reserve a box using another utility such as MetaMask, or a custom utility. The device of the sending user 1 and/or the Utility URL 17 will then generate the key parameters including the public and private key pair. The public key indicates the address of the user's box and the private key, which is used for signing transactions, stays on the device of the sending user 1. The creation of the sender's box 11 and the generation of the key parameters can occur multiple times offline and does not require involvement of the blockchain network 16.

Once the sender's box 11 has been created, the sending user 1 can perform a deposit transaction in order to deposit token's or value into the sender's box 11. For the deposit, the sending user can use the Utility URL 17 and/or a third party Money Services Business (MSB) website 19, such as Moonpay.io, to obtain a signed deposit transaction. It is noted that the private key is not required for a deposit transaction, but only to redeem tokens or value. The Utility URL 17, in the case it is not used for the creation of the box and/or deposit, can be informed of the public key associated with the box and/or the deposit information from the sending user 1. Alternatively, a custom utility on the device of the sending user 1 could generate the URL using the key parameters. Preferably, the URL is represented by a QR code 15. The deposit can take place before or after the QR code is generated. The Utility URL 17 and/or the sending user 1 then make a call to the computer programs 18 in the blockchain network 16 to associate the tokens or value to the sender's box 11.

When the sending user 1 shares the QR code 15 with the recipient user 2, and the URL associated therewith is loaded into the recipient user's web browser, several steps that are controlled by the recipient user 2, either utilizing the Utility URL 17 or directly interacting with the computer programs 18, occur automatically:

1. The URL directs to the Utility URL 17, or another server, which returns a HyperText Markup Language (HTML) page having computer code for functions to be executed by the device of the recipient user 2, for example by a web browser thereof.
2. The device of the recipient user 2, using the computer code of the HTML, generates key parameters (e.g., in the same manner as the sending user 1) including a public and private key pair and stores the key pair locally on the device.
3. The device of the recipient user 2, using the computer code of the HTML, applies the private key of the sending user 1 contained in the URL to sign the transaction.
4. Using the key parameters and the computer code of the HTML, a software mechanism produces a signed transaction to the public smartcontract, which includes a signed message and cryptographically verifies that the sending user 1 properly authorized the transfer of their tokens or value. The message is signed by the device that executes the URL using the private claim key (also referred to herein as claimKey of claimPK) of the sending user 1, which is included in the URL, and the device includes the signed message within a transaction that is signed using the private key (also referred to herein as privateKey) generated for the recipient user 2 upon execution of the URL.
5. Once the blockchain network verifies and reaches consensus on the transaction, which is initiated by the execution of the URL triggering the generation, signing and sending of the message, the computer programs 18 move the tokens or value out of the blockchain address of the sending user 1, or the sender's box 11, and into another blockchain address, or recipient's box 12, associated with the recipient user 2. Accordingly, in an automated manner initiated by execution of the URL, the computer programs 18 associate the ownership of the tokens or value to a new address, or recipient's box 12.

The HTML contains the functions (computer code) which are to be executed by the device/web browser of the recipient user 2 to generate the key pair (thereby creating also the recipient's box 12 at an index identified by the public claim key) and to sign a message by extracting and using the private key of the sending user 1 contained in and extracted from the URL. This signed message verifies that the transaction is authorized. The computer code also generates a signed transaction containing the signed message which is sent to the computer programs 18 to move the tokens or value from the sender's box 11 to the recipient's box 12. This transaction is signed by the device of the recipient user using the private key also generated on the device. Alternatively, the computer code does not have to be sent as HTML and other formats for sending executable code are also possible.

For example, the following claimCode function can be initiated by execution of the URL to automatically and securely transfer the designated tokens or value from the sender's box 11 to the recipient's box 12:

```
function claimCode (signedMessage, fromIndex, toIndex)
  { // move funds from fromIndex -> toIndex
  require(decode(signedMessage) === boxes[fromIndex].claimPublicKey)
  boxes[fromIndex].transferTokens(toIndex) }
```

The fromIndex identifies the address of the sender's box 11 and the toIndex identifies the address of the recipient's box 12 on the blockchain network 16. The signedMessage is an authorization for the transaction created on the device of the recipient user 2 and containing the transaction that has been signed using the claim key of the sending user 1 contained in and extracted from the URL upon execution of the URL on the device of the recipient user 2.

Embodiments of the present invention advantageously combine particular functions imparted to users (computing nodes) of the blockchain network 16 through the computer programs/smartcontracts (computer program code), and the convenient and rapid execution of commands in that computer program code by a web browser URL execution. According to one embodiment, the URL can be represented by a QR code 15. However, other ways of representing or sharing a URL could also be used.

While the Utility URL 17 is a useful tool for interacting with the computer programs, it is not required in all embodiments of the present invention. Rather, the computer programs 18, which adapt the blockchain network 16 to improve its functionality according to embodiments of the present invention to permit URL-based transactions without requiring a blockchain account, can be called to or initiated in other ways. For example, any software that can send the correct parameters of the sending user 1 to the computer programs 18 for decryption and execution can interact with the public computer program code. For example, MetaMask is one such software that could be used for this purpose. This results in flexibility and security as the public smartcontract is controlled entirely by parameters held by the users.

Embodiments of the present invention also solve a technical problem preventing direct transfers through a blockchain network 16 that is caused by so called "gas fees" which can be required in connection with certain blockchain write transactions (e.g., such as the case with the Ethereum blockchain network) that users may initiate using the Utility URL 17 or directly with the computer programs. This fee amount must be paid, when applicable, by the sending user 1 initiating a transfer in order for the computer programs 18 to sign and send a transaction between two blockchain addresses. When a sending user 1 initiates such a transfer, the computer programs 18 will reduce the amount transferred by the value of the gas fees. This reduction is initiated and controlled by the sending user 1, via the computer programs 18, which themselves have no control over the amount of the sending user's gas fees that are required, and this amount can vary depending on the blockchain network 16 that is being used.

Embodiments of the present invention also solve a further technical problem that exists when the token or other value held by the sending user 1 cannot be used to satisfy the gas fees. In this situation, embodiments of the present invention introduce a software-based mechanism that allows the sending user 1 to obtain the necessary gas fees from a decentralized exchange by initiating the transfer. By using the computer programs 18 to initiate a transfer involving a transaction on a decentralized exchange, the sending user 1 also initiates the transaction on the decentralized exchange, such that control over this decentralized exchange and the user's initiation of a transaction on the decentralized exchange advantageously remains with the sending user 1.

Each time a sending user 1 creates a transaction (e.g., sending tokens using the Utility URL 17), a percentage of the total token value could also be sent to a different dedicated blockchain account, for example that is held by the owner or controller of the computer programs, or the operator of the Utility URL 17. A sending user 1 may make multiple transfers of any amount. Each of these transactions are initiated from a unique URL (e.g., represented by a QR code 15). Along with the transfer functionality, additional logic in the computer program code can be layered on top of the transfer to allow granular control of its execution.

In an exemplary embodiment, the QR code 15 can be time limited (e.g., valid only for a 24 hour period). In this embodiment, a sending user 1 creates a payment link with a set value, and a 24 hour automatic expiration time. The user

```
ivy.cash/?
claimKey=0x701b615bbdfb9de65240bc28bd21bbc0d996645a3dd57e7b12bc2bdf6f192c82
index=5023293293
privateKey=0x348234923945bdfb9de65240bc28bd21bbc0d99664534284924923KJ82
claim=true
```

1 shares this link using their own means (e.g., email) with the recipient user 2. Within 24 hours, the recipient user 2 may open and claim this link, at which point the transfer from the sending user 1 to the recipient user 2 is automatically confirmed via the computer programs.

Additionally or alternatively, in another exemplary embodiment, the QR code 15 requires confirmation to trigger the transfer to the recipient's box 12. In this embodiment, the sending user 1 creates a payment link with a set value and the sending user 1 sends this link using their own means to the recipient user 2. When the recipient user 2 opens this link, and claims it by authenticating, a verification code is generated and shown to both to the sending user 1 and the recipient user 2 on their respective devices. Upon visual verification of the code, the sending user 1 confirms the payment and completes the transfer to the recipient user 2.

Additionally or alternatively, in another exemplary embodiment, the QR code 15 requires proof-of-credential to trigger transfer. In this embodiment, the sending user 1 creates a payment link with a set value and the sending user 1 shares this link using their own means with the recipient user 2. When the recipient user 2 opens the link, a proof-of-credential check (e.g., login with username/password) is performed before the transfer will initiate. Examples of proof-of-credential include: 1. proof of geographic location; 2. proof of good standing such as anti-money laundering or know your customer verification (AML/KYC); 3. proof of citizenship; 4. proof of membership in an organization (e.g., proof of being a fiduciary of a specific company); 5. proof of good standing in a network based on querying a decentralized reputation scheme (e.g., a blockchain notarized reputation); and/or 7. Oracle verified proofs (e.g., funds cannot be transferred unless certain conditions are met such as providing a proof that the user has performed 200 hours of community service as proved by an on-chain verification method.)

The URL structure of the URL created by the computer programs could take the following example form, containing example key parameters to interface with the computer program code.

```
ivy.cash/?
claimKey=0x701b615bbdfb9de65240bc28bd21bbc0d996645a3dd57e7b12bc2bdf6f192c82
index=5023293293
privateKey=0x348234923945bdfb9de65240bc28bd21bbc0d99664534284924923KJ82
claim=true
```

Another possible form of the URL could be as follows (where execution of claim=true would cause the device of the recipient user 2 to generate a private key):

```
ivy.cash/?
claimKey=0x701b615bbdfb9de65240bc28bd21bbc0d996645a3dd57e7b12bc2bdf6f192c82
index=5023293293
claim=true
```

A further possible form of the URL could be as follows (recovery):

```
ivy.cash/?
claimKey=0x701b615bbdfb9de65240bc28bd21bbc0d996645a3dd57e7b12bc2bdf6f192c82
index=5023293293
privateKey=0x348234923945bdfb9de65240bc28bd21bbc0d99664534284924923KJ82
```

In these examples, the purpose of the parameters is as follows:

1. claimKey: The private key the sending user uses to sign a Keccak hash of their address and the index of the code. This is used to verify permission. This private key is not associated to a particular blockchain network 16.
2. Index: The smartcontract index of the code (the address of the sender's box 11 on the blockchain network 16).
3. privateKey: The private key for the sender's box 11. This private key is associated with the address of the sender's box 11 and not the sending user 1 and can be used to sign transactions. In particular, this private key is usually associated with particular native blockchain network 16 which is being used (e.g., an Ethereum account) and is not required or used in all embodiments. This key could be used for logging in, recovery or for other blockchain transactions.
4. claim: A handler to determine if the URL should be used to perform an action (e.g., initiate a claim). For example, where claim=true, the device of the recipient user 2 will extract the claimKey and index from the URL and try to retrieve the tokens or value in the sender's box 11, and will also generate a private key for signing further transactions.

According to embodiments of the present invention, there are two potential processes for interacting with the computer programs. One process involves users interacting with the Utility URL 17 (website or app), and another process involves users interacting directly with the computer programs 18.

Figure 3A:
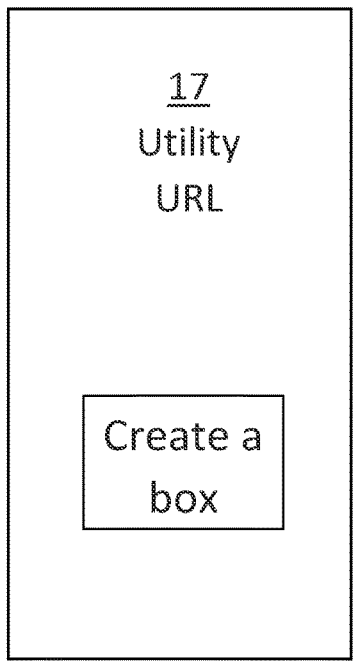
FIGS. 3A-3E are examples of a web utility interface also referred to herein as the Utility URL.

A sending user 1 who wishes to initiate a transaction using a blockchain network 16 (e.g., to send ERC-20 tokens to a recipient user 2) utilizing the Utility URL 17 will first navigate to that website which presents the sending user 1 with the Utility URL graphical user interface shown in FIG. 3A. The graphical interface allows the sending user 1 to create a new "code" or "box" (also referred to herein as the sender's box 11) at which the ERC-20 tokens can be deposited. The sender's box 11 is essentially a sub-ledger within the IVYBoxManager computer program 27 (see FIGS. 2A-2D), which itself will have, in this example, an Ethereum address in which various ERC-20 tokens belonging to multiple users will be held.

Figure 3B:
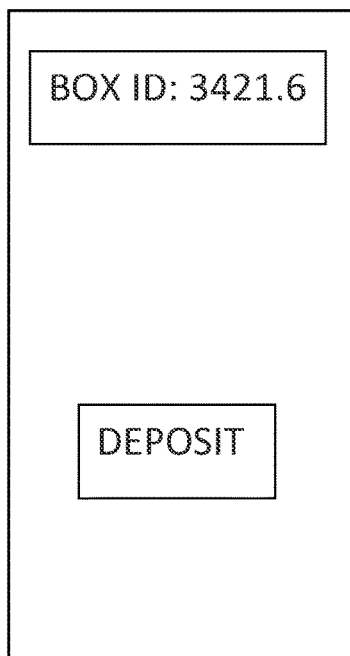

The sending user 1 has two options to load the ERC-20 tokens into the sender's box 11. As a first option, if the sending user 1 already holds ERC-20 tokens and sufficient ETH to pay the necessary gas fee, the sending user 1 can use a third-party utility such as MetaMask to send the ERC-20 tokens to the sender's box 11. As a second option, the graphical user interface of the Utility URL 17 shown in FIG. 3B provides an input option for the sending user 1 to purchase the ERC-20 tokens from the MSB website 19, which is an independent licensed money transmitter. If the sending user 1 clicks on this option, the sending user 1 can be directed to the MSB website 19, where the sending user 1 can independently purchase the ERC-20 tokens. The address of the sender's box 11 is preferably automatically loaded into the MSB website 19 by the redirect, so that the sending user 1 does not need to manually input it. After the sending user 1 purchases the ERC-20 tokens, the tokens will be sent by the MSB website 19 to the sender's box 11, at the cost of the sending user 1, and the sending user will be routed from the MSB website 19 back to the web address of the Utility URL 17. In either case, the computer programs 18 receive a signed deposit transaction in order to reach consensus on it, add it to the distributed ledger and associate the tokens or value of the deposit to the sender's box 11.

Regardless of whether the sending user 1 uses a direct call to the computer programs 18 or deposits via the Utility URL 17 and MSB website 19, the sending user 1 then will have the ERC-20 tokens in the sender's box 11 in the computer program code of the IVYBoxManager computer program 27. At this point, or prior to the deposit after calling the create a box function, the sending user 1 is presented with the QR code 15 (e.g., displayed on the website or sent by message or email) representing the URL for the sender's box 11. The sending user 1 can copy this QR code 15 and provide it to the recipient user 2. When the recipient user 2 scans the QR code 15, a set of steps take place that ultimately result in the underlying amount of the ERC-20 tokens in the sender's box 11 (not including gas or service fees) being transferred to a "code" or "box" of the recipient user 2 (also referred to herein as the recipient's box 12). These steps will be executed automatically by the computer programs 18 introduced by embodiments of the present invention and advantageously do not require any action by a third-party or the Utility URL 17.

FIGS. 2A-2D together show a UML diagram illustrating a protocol 20 with the calls and interaction among the sending user 1, the recipient user 2 and different computer programs 21-29, at least some of which are public smart-contracts which adapt and run in the blockchain network. The computer programs 21-29 include a ServiceFeeERC20 computer program 21, IVYServiceFeeAddr computer program 22, PriceManager computer program 23, DEXManager computer program 24, WETHContract 25, Uniswap computer program 26, IVYBoxManager computer program 27, Paymaster computer program 28 and RelayHubGSN computer program 29. According to an embodiment, the Uniswap computer program 26 and the RelayHubGSN computer program 29 are third-party web-based utilities which do not reside on the blockchain network, while the ServiceFeeERC20 computer program 21, IVYServiceFeeAddr computer program 22, PriceManager computer program 23, DEXManager computer program 24, WETHContract 25, IVYBoxManager computer program 27 and Paymaster computer program 28 are smartcontracts which adapt the functionality of the blockchain network. At a high level, steps of the protocol 20 include:

The IVYBoxManager computer program 27 receives a transaction to deposit tokens or values into a user box (an address on the blockchain network opened by the user or the Utility URL) and writes the transaction to the ledger upon the blockchain network reaching consensus (see, e.g., steps S3$a$1, S3$a$3 and S3$a$13).

The IVYBoxManager computer program 27 receives a signed transaction containing a signed message upon the scanning of a QR code representing the URL or other execution of the URL, and writes the transaction to the ledger upon the blockchain network reaching consensus such that tokens or value are moved from a sender's box associated with the URL to a new box which was created for the recipient user 2 that scans the QR code upon that user executing the URL (see, e.g., steps S5$a$1, S5$a$3 and S5$a$13).

The Paymaster computer program 28 interacts with the PriceManager computer program 23, which obtains the price of gas fees through a direct calculation or from a third party software utility (e.g., ChainLink), and calculates the amount of gas fees needed to perform all the steps and transmits that information to the IVYBoxManager computer program 27 (see, e.g., steps S3$a$4-S3$a$12);

The PriceManager computer program 23 communicates the amount (e.g., of tokens in Ethereum, or ETH) needed for the gas fees to the Paymaster computer program 28 (see, e.g., step S3$a$7);

The Paymaster computer program 28 pays the amount of gas fees, in ETH, necessary to send the sending user's ERC-20 tokens from the sender's box to the recipient's box in the IVYBoxManager computer program 27. In particular, the gas fees are paid to a so called Gas Station Network (GSN), which is preferably an independent service indicated by the RelayHubGSN computer program 29, and causes the underlying amount of the sender's ERC-20 tokens to be sent from the sender's box to the recipient's box (see, e.g., steps S3$a$4-S3$a$13);

Optionally, the IVYServiceFeeAddr computer program 22 causes a percentage (e.g., 2%) of the sending user's tokens to be sent to an account or blockchain address as a service fee (see, e.g., step S3$a$14);

The DEXManager computer program 24 requests that a decentralized exchange (e.g., Uniswap) withdraw the requisite amount of ERC-20 tokens from the sender's box to pay for the requisite amount of ETH needed for the transfer of the underlying amount of ERC-20 tokens from the sender's box to the recipient's box, and the decentralized exchange pulls the requisite amount of ERC-20 tokens for the gas fees out of the sender's box, exchanges them for wrapped ETH ("WETH") on the decentralized exchange by interacting with a WETH computer program 25 (which is an existing smartcontract of the Etherium blockchain for wrapping/unwrapping), and sends the WETH (minus the decentralized exchange's fee) to the Paymaster computer program 28. Before being returned to the Paymaster computer program 28, the WETH is "unwrapped" through interaction with the independent WETH computer program 25 such that ETH, rather than WETH, are returned to the Paymaster computer program 28 (see, e.g., steps S3*a*8-S3*a*11);

The Paymaster computer program 28 will thus "front" the ETH necessary to transfer the underlying amount of the ERC-20 tokens from the sender's box to the recipient's box, wherein, if there is no ETH in the Paymaster computer program 28, scanning the QR code will not cause the transfer to the recipient's box to occur, as the entire transfer is atomic.

By the protocol 20, the recipient user 2 reimburses the Paymaster computer program 28 for the fronted ETH and, in at least some embodiments, also pays the service fee. In general, however, it is possible for the either the sending user 1 or the recipient user 2, or both, to pay the fees associated with a transfer. Once the ERC-20 tokens are in the recipient's box, the recipient user 2 has several options:

1. The recipient user 2 can leave the ERC-20 tokens in the receiver's box indefinitely.
2. The recipient user 2 can transfer the ERC-20 tokens to another individual or entity (the "recipient's recipient") using the Utility URL website graphical user interface in the manner of a sending user 1 described above.
3. The recipient user 2 can withdraw the tokens to an external wallet or address using one of two methods. If the recipient user 2 has ETH elsewhere to pay the gas fee for the transfer, the recipient user 2 can use an external utility such as MetaMask to withdraw the ERC-20 tokens from the recipient's box and to pay the required gas fee. If the recipient user 2 does not have the ETH for the gas fee, or does not wish to use their own ETH for the gas payment, the recipient user 2 can use the Utility URL website graphical user interface to send the tokens to an external wallet or address. In that case, the process is essentially the same as what is described above for the sending user 1, with the Paymaster computer program 28 fronting the gas in ETH, ERC-20 tokens being exchanged for WETH on the decentralized exchange, and the Paymaster computer program 28 being reimbursed in ETH for the gas it has fronted.

An application binary interface (ABI) can be used to interact with the computer programs 18 that are present on the blockchain network 16. Similar to an API (Application Program Interface), a human-readable representation of a code's interface, an ABI defines the methods and structures used to interact with the binary computer program codes. For example, the ABI can convert the smartcontract address and present the functions available for that address (e.g., spend, store, withdraw) in human-readable form.

Embodiments of the present invention also improve existing technology for sending and sharing links (URLs) using, for example, the QR codes 15, by adding the automatic ability to cryptographically sign transactions at the time of URL execution on a blockchain network 16.

The transaction or transfer could be of any token type, including in the form of a non-fungible token (NFT), a special type of cryptographic token which represents something or someone in a unique way. NFTs are often exchanged on platforms that offer collectible items, works of art, access keys, lottery tickets, numbered seats for concerts and sports matches, etc.

In an embodiment, the present invention provides an ERC20/721 (fungible/non-fungible tokens) smartcontract browser-based software mechanism utility allowing a computing node or user device on a blockchain network 16 to initiate and sign a blockchain transaction between two addresses, where a sending user 1 presents a Quick Response (QR) code 15 (representing a URL) to a recipient user 2. Upon the recipient user 2 scanning the QR code 15 and loading the URL in the web browser on their computing device, the tokens or value are moved from the blockchain wallet address, or sender's box 11, associated with the QR code 15 being held by the sending user 1, to a new blockchain wallet address, or recipient's box 12, now controlled by the recipient user 2. These addresses are controlled and tracked by the computer programs, in particular the IVYBoxManager computer program 27.

Advantageously, all the key parameters required to sign and send a transaction using an external tool (e.g., MetaMask) are included in the URL such that the sending user 1 can interact directly with the computer programs. In other words, software that can send the correct parameters of the sending user to the computer programs for decryption and execution can interact with that computer program code. Even though the users tokens or value are stored at blockchain addresses controlled and in most cases generated by the computer program code, they are entirely controlled by parameters held by the sending user 1. It is also possible to use the Utility URL 17 described above to make the parameter input and URL execution even easier and faster. The parameters are an index key, a claim key and a private key. In contrast to existing technology, no additional password, user account, or software is needed to complete the transfer, and such is also not required for further transfers by the recipient user 2.

Upon sending user 1 sharing the QR code 15 with recipient user 2, and the loading of this URL by recipient user 2, the software utility and computer program code signs and associates the ownership of the token value(s) to a new blockchain address, or recipient's box 12, controlled by the computer program code of the computer programs. Using the key parameters, the software mechanism produces a signed message to the computer program code, which cryptographically verifies that the sending user 1 properly authorized the transfer of their tokens. Then, the computer program code acts to move tokens out of one blockchain address associated with the sending user 1, or the sender's box 11, and into another blockchain address associated with the recipient user 2, or the recipient's box 12.

Where there is a gas fee or other fee associated with a blockchain write transaction, as is the case with the Ethereum blockchain, this fee is paid in advance by the computer program code in order to sign and send a transaction between two blockchain addresses. This fee is also recouped by the computer program code in an automatic fee generation at the time of the write transaction. Each time a transaction is sent, regardless of whether a gas fee is required, the computer program code can also send some percentage of the total token value to a dedicated account as a fee for the fast and easy transfer of value via the URL, and/or for the generation of a new blockchain address for recipient users 2 who do not have already have an account on the blockchain network 16.

Embodiments of the present invention also provide improvements over existing technology by ensuring that the users' tokens or value are secured and in persistent sole custody of the users, thereby enhancing security against misbehaving entities that could own or maintain the computer programs which adapt the blockchain network 16 to allow for the URL-based transfers. Because all the parameters to sign and send the transaction are included in the URL itself and do not require any additional authentication to execute, the only requirement to use the system 10 is to hold the URL. At no time does the owner or maintainer of the computer programs or the Utility URL 17 have access to the key parameters that would grant token access. The computer program code which controls this custody cannot be upgraded or changed on the blockchain network 16, and therefore it is not possible to make a change that would alter the users' sole custody configuration. In particular, the parameters of the sending user 1 used to generate the URL control sole custody of the underlying tokens or value. They are held in the URL that is loaded in the web browser of the recipient user 2 upon claiming of the QR code 15. An example of the URL structure is as follows:

https://ivy.cash/accept?claimPK=0x49a43b8ce303854cdf162e8cd2d4ce864be78e03e753bc9b6b5c43f9ba8013d917dcf9181047351575d1fba837c96b6d6e574a40e3336b3e6b9d5a13b20a45ed1c&index=0x87c00d46afaa54feebe6b7f59f00e1b13ffc2e6fda1d3c061c9bc4f5c20c8ae9&privateKey=0x49a43b8ce303854cdf162e8cd2d4ce864be78e03e753bc9b6b5c43f9ba8013d917dcf9181047351575d1fba837c96b6d6e574a40e3336b3e6b9d5a13b20a45ed1c In this example the purpose of the parameters is as follows:

TABLE 1

| URL Parameter Example | Purpose |
|---|---|
| claimPK | Signature of the Keccak hash of the owner address, nonce of the code, and index of the code. Used to verify permission. |
| privateKey | The private key of the address that owns the value in the link |
| index | Index of the code corresponds to our smart contract ledger. |

When all of these parameters are supplied to the computer programs to claim the underlying tokens or value the following occurs:

1. A function of the computer program code computes the cryptographic hash of the claimPK, index, and privateKey value using the Keccak hash function.
2. The cryptographic hash computed in step 1 is used to cryptographically recover the unique blockchain address that signed the hash. This function is often called ecRecover and is available for elliptic curve cryptographic signing functions, such as for secp256k1.
3. At this point, the computer program provides functions to withdraw funds to an external account or wallet (full custody of tokens).

Referring again to FIGS. 2A and 2B, the interaction amongst the users 1, 2 and the computer programs 21-29 is shown in detail. The computer programs 21-29 include:

ServiceFeeERC20 computer program 21: Computer program code that defines which tokens can and cannot be deposited into a URL/QR code/sender's box. This ServiceFeeERC20 computer program 21 is preferably upgradable and not pausable.

IVYServiceFeeAddr computer program 22: Computer program code that defines where the service fees are sent to. This IVYServiceFeeAddr computer program 22 is preferably not upgradable and not pausable.

PriceManager computer program 23: Computer program code that defines the current price of gas or other transaction fees, preferably using third-party oracle integration (e.g., ChainLink). This PriceManager computer program 23 is preferably upgradable and not pausable. The PriceManager computer program 23 interacts with ChainLink which is an existing Ethereum smartcontract for getting market value of ETH and the price of gas. The price of gas can also be directly calculated by the PriceManager computer program 23.

DEXManager computer program 24: Computer program code that handles the sale of tokens during transfer to pay for the gas required to facilitate the transfer of tokens from one address to another. The tokens needed for gas are passed to the Paymaster computer program 28. This DEXManager computer program 24 is preferably upgradable and pausable.

WETHContract computer program 25: Computer code of an existing smartcontract on the Ethereum blockchain network that is used for wrapping and unwrapping ETH.

Uniswap computer program 26: Computer program code of a decentralized exchange (DEX) that facilitates the sale of the tokens. This Uniswap computer program 26 is preferably external (e.g., redirect to a third-party website offering a software utility for the token exchange).

IVYBoxManager computer program 27: Computer program code which creates and manages token movement and ownership between addresses. This IVYBoxManager computer program 27 is preferably not upgradable to ensure security and sole control over the parameters and transaction and not pausable.

Paymaster computer program 28: Computer program code which handles the gas fee payment to the gas station network (GSN) on behalf of the sending user 1 using the ETH generated during the sale process by the DEXManager computer program 24. This Paymaster computer program 28 is preferably not upgradable to further enhance security against misbehaving entities and pausable.

RelayHubGSN computer program 29: Computer program code which handles the actual gas payment on the Ethereum network (or other transaction fees on other blockchain networks). This RelayHubGSN computer program 29 is preferably external (e.g., redirect to a third-party website, e.g., the one maintained by the organization OpenGSN.org).

The individual steps of the protocol 20 will now be explained in further detail. Unless a step is required to be performed before another steps, the steps can be performed in any order. In order to create a new QR code, and associated sender's box and transfer functions, a sending user 1 creates a new address (box) on the blockchain network in step S1 (create a box: new code->actor creates new box ID. This step S1 represents the creation of a new (empty) QR code which is ready to have funds deposited into it. Step S1 can be performed using the Utility URL 17 or by a third-party or custom utility.

In step S2, the sending user 1 is able call to the ServiceFeeERC20 computer program 21 to approve a deposit of initial tokens into the sender's box. This step S2 represents the token approval for a deposit into the sender's box associated with the QR code. This call can take place via an external tool (e.g., MetaMask) or via the Utility URL 17, or the sending user 1 or a third party sending tokens to the address of the sender's box (e.g., via Moonpay AML/KYC).

Next, it is possible in step S3$a$ to transfer tokens to the new box, and to pay any gas fees using the RelayHubGSN computer program 29, or in step S3$b$ to transfer tokens to the new box paying for the gas fee directly. In step S3$a$1, assuming the tokens were approved for a deposit in step S2, and that the sending user 1 is using the Utility URL 17 to initiate and execute a transfer to the new box, a call to the function createBox is made to the IVYBoxManager computer program 27, which provides the key parameters generated by the sending user 1 in step S1 and a check that the tokens were approved by the ServiceFeeERC20 computer program 21 in step S2. In step S3$a$2, the IVYBoxManager computer program 27 calls to the Paymaster computer program 28 to transfer sufficient tokens to cover the required gas fee. Here, it can be checked that the deposit transaction will cover a maximum expected gas fee. In step S3$a$3, the IVYBoxManager associates the amount of the approved tokens or value from step S2 with the address of the sender's box created in step S1. In steps S3$a$4 and S3$a$5, the IVYBoxManager computer program 27 calls to the RelayHubGSN computer program 29 to trigger selling the required amount of tokens on the decentralized exchange to pay for the required gas fee. For this, in step S3$a$6, the Paymaster computer program 28 calls to the PriceManager computer program 23 to determine the amount of required gas fee, which is received back in step S3$a$7. In step S3$a$8, the Paymaster computer program 28 calls to the DEXManager computer program 24 with the amount of tokens it needs to use to acquire the wrapped ETH (WETH) required to cover the gas fee. In step S3$a$9, the DEXManager computer program 24 calls to the Uniswap computer program 26 to sell the tokens for the required WETH on the decentralized exchange. In step S3$a$10, the DEXManager computer program 24 calls to the existing WETHContract computer program 25 on the Ethereum blockchain network to convert the WETH to ETH. In step S3$a$11, this amount of ETH is returned to the Paymaster computer program 28 and paid to the GSN by calling to the RelayHubGSN computer program 29 in step S3$a$12. In step S3$a$13, the Paymaster computer program 28 instructs the IVYBoxManager computer program 27 to transfer the remaining token balance to the new address, or sender's box. In step S3$a$14, the IVYBoxManager computer program 27 calls the IVYServiceFeeAddr computer program 22 to deposit the transaction fee. At this point, the tokens or value in the sender's box are ready to be claimed by a recipient user 2 using the URL which was sent to the sending user 1 (e.g., represented by a QR code). The URL and/or QR code can be sent by the sending user 1 by any means, such as by email. The end result of step S3$a$ as a whole is the writing of a transaction, by the IVYBoxManager computer program 27, to the distributed ledger associating the remaining balance of tokens or value to the sender's box. Step 3$a$ is an atomic transaction, wherein if any sub-step within it fails, the transaction does not go through and is not written to the distributed ledger.

As an alternative, it is also possible to perform the steps to calculate the gas fees and any other costs ahead of time, and inform the sending user 1 so that the sending user 1 has a better understanding of how much should be deposited for a recipient user to receive a certain amount of tokens or value minus the gas fees and other costs. This can be done, for example, by a direct call to the Paymaster computer program 28 which interacts with the DEXManager computer program 24 for determining a price of gas for a specified transfer amount as in steps S3$a$6 and S3$a$7.

In step S3$b$1, assuming the tokens were approved for a deposit in step S2, and that the sending user 1 is using direct calls to initiate and execute the transfer to a new address, a call to the function createBox is made to IVYBoxManager computer program 27, which associates the tokens approved for deposit with the address created by the sending user 1. In other words, the IVYBoxManager computer program 27 receives a signed deposit transaction associated with an index address created by the sending user 1 and contained in a URL, broadcasts that signed deposit transaction for reaching consensus and writes the transaction to the distributed ledger. Since in step S3$b$ the sending user 1 covers directly the gas fee for the transaction, plus the transaction fee for which the IVYBoxManager computer program 27 calls to the IVYServiceFeeAddr computer program 22 in step S3$b$2, the remaining tokens are directly deposited into the new sender's box created in step S3$b$3. There is no sale or exchange of tokens by the sending user 1 to cover the gas fee. Instead, the sending user 1 pays the gas fee directly, e.g., via a separate ETH balance in another account or an external account. At this point, the tokens or value in the sender's box are ready to be claimed by a recipient user 2 using the URL which was sent to the sending user 1 (e.g., represented by a QR code). The URL and/or QR code can be sent by the sending user 1 by any means, such as by email.

In step S4, the token or value transfer from one blockchain address (sender's box) to another blockchain address (recipient's box) is provided for in a convenient and automated manner by execution of the QR code and associated URL on the web browser of the device of the recipient user 2. Upon the scan/execution of an existing QR code/URL (which was sent from sending user 1 to recipient user 2) the device of the recipient user 2 retrieves the private key and index from the URL in step S4$a$1 and another new empty box is created in step S4$a$2. This is similar to step S1 above, except it is followed by an immediate deposit of the tokens or value from the sender's box.

In step S5$a$, the tokens are transferred from one blockchain address (sender's box) to another blockchain address (recipient's box) using the Utility URL, or in step S5$b$, the tokens are transferred from one blockchain address (sender's box) to another blockchain address (recipient's box) using the Utility URL and the recipient user 2 covering the gas fees. In step S5$a$1, the recipient user 2 calls the claimBox function of the IVYBoxManager computer program 27 which signs a message using the private claim key of the sending user 1 contained in the URL and generates a transaction signed using a private key of the recipient user 2 generated in step S4$a$2 which contains the signed message, and sends the signed transaction to the IVYBoxManager computer program 27. In step S5a2, the IVYBoxManager computer program 27 calls to the Paymaster computer program 28 to transfer sufficient tokens to cover the required gas fee. In step S5a3, the IVYBoxManager computer program 27 associates the amount of the approved tokens or value in the sender's box to the recipient's box, or in other words, updates the distributed ledger so that the tokens or value in the sender's box is moved to the recipient's box. In steps S5a4 and S5a5, the IVYBoxManager computer program 27 calls to the RelayHubGSN computer program 29 to trigger selling the required amount of tokens on the decentralized exchange to pay for the required gas fee. For this, in step S5a6, the Paymaster computer program 28 calls to the PriceManager computer program 23 to determine the amount of required gas fee, which is received back in step S5a7. In step S5a8, the Paymaster computer program 28 calls to the DEXManager computer program 24 with the amount of tokens it needs to use to acquire the WETH required to cover the gas fee. In step S5a9, the DEXManager computer program 24 calls to the Uniswap computer program 26 to sell the tokens for the required WETH on the decentralized exchange. In step S5a10, the DEXManager computer program 24 calls to the existing WETHContract computer program 25 on the Ethereum blockchain network to convert the WETH to ETH. In step S5a11, this amount of ETH is returned to the Paymaster computer program 28 and paid to the GSN by calling to the RelayHubGSN computer program 29 in step S5a12. In step S5a13, the Paymaster computer program 28 instructs the IVYBoxManager computer program 27 to transfer the remaining token balance to the new address, or recipient's box. In step S5a14, the IVYBoxManager computer program 27 calls the IVYServiceFeeAddr computer program 22 to deposit the transaction fee. At this point, the tokens or value in the recipient's box are ready to be flexibly used by the recipient user 2, who can also become a sending user 1 to perform a further transaction.

In step S5b1, where direct calls are used, the recipient user 2, the recipient user 2 calls the claimBox function of the IVYBoxManager computer program 27. This includes the recipient user 2 initiating a call themselves (e.g., via MetaMask). Since in step S5b the recipient user 2 covers directly the gas fee for the transaction, plus the transaction fee for which the IVYBoxManager computer program 27 calls to the IVYServiceFeeAddr computer program 22 in step S5b3, the remaining tokens are directly deposited into the new receiver's box created in step S4 in step S5b2. There is no sale of tokens by the recipient user 2 to cover the gas fee. Instead, the recipient user 2 covers the gas directly, e.g., via a separate ETH balance in another or external account.

Embodiments of the present invention further modify the blockchain network to provide for withdraw and swap functions described with reference to steps S6a, S6b, S7a and S7b. These additional functions can be called by any owner of a QR code, and not only by the sending user 1 or the recipient user 2.

In step S6a, it is shown how an owner is able to withdraw to an external address using the Utility URL, or in step S6b, it is shown how the owner is able to withdraw to an external account or address using direct calls. In step S6a1, the owner requests to the IVYBoxManager computer program 27 to withdraw using their private key. In step S6a2, the IVYBoxManager computer program 27 calls to the Paymaster computer program 28 to transfer sufficient tokens to cover the gas fee. In steps S6a3 and S6a4, the IVYBoxManager computer program 27 calls to the RelayHubGSN computer program 29 to trigger selling the required amount of tokens on the decentralized exchange to pay for the required gas fee. For this, in step S6a5, the Paymaster computer program 28 calls to the PriceManager computer program 23 to determine the amount of required gas fee, which is received back in step S6a6. In step S6a7, the Paymaster computer program 28 calls to the DEXManager computer program 24 with the amount of tokens it needs to use to acquire the WETH required to cover the gas fee. In step S6a8, the DEXManager computer program 24 calls to the Uniswap computer program 26 to sell the tokens for the required WETH on the decentralized exchange. In step S6a9, the DEXManager computer program 24 calls to the existing WETHContract computer program 25 on the Ethereum blockchain network to convert the WETH to ETH. In step S6a10, this amount of ETH is returned to the Paymaster computer program 28 and paid to the GSN by calling to the RelayHubGSN computer program 29 in step S6a11. In step S6a12, the Paymaster computer program 28 instructs the IVYBoxManager computer program 27 to transfer the remaining token balance to the owner's box. In step S6a13, the IVYBoxManager computer program 27 sends the tokens or value in the owner's box to an external address provided by the owner.

In step S6b1, the owner requests to withdraw to an external address using a direct call to the IVYBoxManager computer program 27. Since in step S6b the recipient user 2 covers directly the gas fee for the transaction, the remaining tokens are directly deposited in step S6b2 into the external address provided by the owner. These tokens are transferred to the receiver's box in step S5b2. There is no sale of tokens by the recipient user 2 to cover the gas fee. Instead, the recipient user 2 covers the gas directly via a separate ETH balance in their external wallet (e.g., by direct calls through a third-party utility such as MetaMask).

In step S7a, the owner is able to swap tokens or value using Utility URL, or in step S7b, the owner is able to swap tokens or value using the Utility URL. In step S7a1, the owner sends a request to swap tokens or value to the IVYBoxManager computer program 27 via the Utility URL. This triggers the IVYBoxManager computer program 27 to request the DEXManager computer program 24 in step S7a2 to swap tokens or value using the Uniswap computer program 26 over the decentralized exchange in step S7a3. The tokens which were bought on the decentralized exchange are returned to the DEXManager computer program 24 in step S7a4, which refunds any remaining tokens and the transfers the swapped tokens to the IVYBoxManager computer program 27 in step S7a5. In step S7a6, the IVYBoxManager computer program 27 calls to the Paymaster computer program 28 to transfer sufficient tokens to cover the gas fee. In steps S7a7 and S7a8, the IVYBoxManager computer program 27 calls to the RelayHubGSN computer program 29 to trigger selling the required amount of tokens on the decentralized exchange to pay for the required gas fee. For this, in step S7a9, the Paymaster computer program 28 calls to the PriceManager computer program 23 to determine the amount of required gas fee, which is received back in step S7a10. In step S7a11, the Paymaster computer program 28 calls to the DEXManager computer program 24 with the amount of tokens it needs to use to acquire the WETH required to cover the gas fee. In step S7a12, the DEXManager computer program 24 calls to the Uniswap computer program 26 to sell the tokens for the required WETH on the decentralized exchange. In step S7a13, the DEXManager computer program 24 calls to the existing WETHContract computer program 25 on the Ethereum blockchain network to convert the WETH to ETH. In step S7a14, this amount of ETH is returned to the Paymaster computer program 28 and paid to the GSN by calling to the RelayHubGSN computer program 29 in step s7a15. In step S7a16, the Paymaster computer program 28 instructs the IVYBoxManager computer program 27 to transfer the remaining token balance to the owner's box. In step S7a17, the IVYBoxManager computer program 27 updates the token balance in the owner's box.

In step S7b1, the owner makes a direct call to the IVYBoxManager computer program 27 to swap tokens. This triggers the IVYBoxManager computer program 27 to request the DEXManager computer program 24 in step S7b2 to swap tokens or value using the Uniswap computer program 26 over the decentralized exchange in step S7b3. The tokens which were bought on the decentralized exchange are returned to the DEXManager computer program 24 in step S7b4, which refunds any remaining tokens (if applicable) and transfers the swapped tokens to the IVYBoxManager computer program 27 in step S7b5. The balances of the owner's box are then updated by the IVYBoxManager computer program in step S7b6.

Figure 3C:
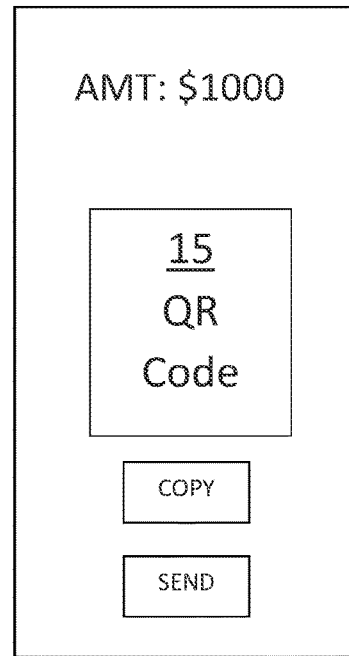
Figure 3D:
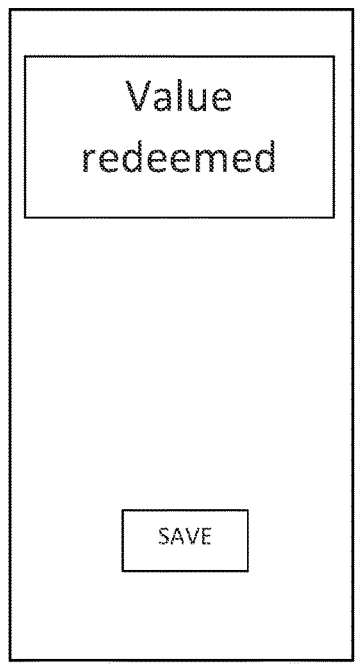
Figure 3E:
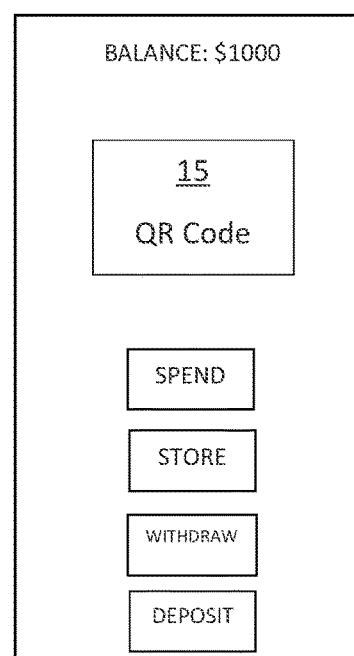

FIGS. 3A-3E show different views of an example web utility user interface, or the Utility URL 17. In a first scenario, a sending user 1 shares a total code value with a recipient user 2. First, as shown in FIG. 3A, the sending user 1 is presented with an option to create a box, and then, in FIG. 3B is given the option to deposit tokens or values into that box. As shown in FIG. 3C, the sending user 1, after creating a box and depositing $1,000 in value, currently holds the QR code that represents $1,000 in value, which the sending user 1 desires to transfer to the recipient user 2 in its entirety. The sending user 1 can copy the QR code, and then send it by its own means to any recipient user 2, or can send it to the recipient user 2 using the Utility URL 17 (e.g., by inputting an email address). Upon scanning, the QR code opens the associated URL on the existing web browser of the device of the recipient user 2. The recipient user 2 is then presented with a webpage on the browser of their device, such as that shown in FIG. 3D, with a single call to action asking them to save the page data by pressing save to continue. Upon tapping save, the recipient user 2 is prompted to save their key parameters to their browser password manager. After having done this, the recipient user 2 is presented with an option to claim and complete the transaction. After the recipient user 2 has stored the parameters successfully, an interface such as that shown in FIG. 3E now appears and additional functions can be accessed. In particular, the recipient user 2 can take the following actions: spend, store, withdraw and deposit.

The spend option allows the recipient user 2 to send the value in their QR code (see FIG. 3E), which could be generated by the Utility URL 17 in the same manner as for the sending user 1, to another recipient user by sharing their QR code in the same fashion it was shared with them by the sending user 1. This process can be repeated an unlimited number of times, each time creating a new code and transferring the value from one box to another. Additionally, after tapping the spend option, the recipient user 2 may specify a partial value to debit from their current code value and create a new code for a lesser amount to then share with the further recipient user. For example, the $1,000 QR code could be split into two $500 QR codes.

The store option allows the recipient user 2 to (re)initiate the process of saving their key parameters to the password manager of their device, and/or to bookmark the QR code depending on their device configuration.

The withdraw option allows the recipient user 2 to send underlying funds of the QR code to an external blockchain wallet address. The recipient user 2 may also withdraw their token value to FIAT money to an external account through the third-party processor Moonpay.io who could also conduct the AML/KYC process before finalizing the transaction.

The deposit option allows the recipient user 2 to deposit directly to the blockchain wallet address associated with the QR code, or the recipient's box, and/or to add value using a major debit or credit card. The debit/credit card process includes an AML/KYC process and is facilitated by the third-party processor Moonpay.io.

The web utility can also allow new users to create an empty code or box, which can accept deposits of new tokens, either via direct deposit or via Moonpay.io (AML/KYC). The web utility can further allow users to retrieve existing funds by a box lookup function using their parameters. In particular, users can use the three key URL parameters that they have saved to the password manager to reload a page where they can access funds.

Embodiments of the present invention provide for enhanced security since the signed code and URL parameters represent the user's private key, and are never transmitted to third parties or saved by others in any form, but rather are stored only on the user's device. Therefore, the token custody remains with the holder of the signed code, and no other party is able to sign and send transactions from the box associated with the URL.

In the following, further embodiments of the present invention are described. It will be understood that features of the embodiments described below can also be combined with features of embodiments described above.

In an embodiment, the present invention provides a computerized method for facilitating the creation of a stored value into a unique link (e.g. a URL containing a cryptographic signature). A storage of value could include, but would not be limited to, an ERC-20 token, such as WBTC (Wrapped Bitcoin), or other digital assets, such as non-fungible tokens (NFT's). The link specifically has the ability to do the following with interaction with computer programs that adapt the functionality of the blockchain network:

a) To authorize the transfer of funds from one blockchain wallet address to another without the recipient needing to be defined at the time the unique link is created.

b) To enforce a disbursement dependent on conditions defined by the sending user or link creator. Additional restrictions on the transfer of funds can include parameters such as time, place or address eligibility.

c) The creator of the link may commit funds to a dedicated blockchain address that can act as an escrow to guarantee the payment will have funds to transfer. The blockchain based escrow address may be configured by the sender to only allow withdrawal of funds under certain conditions. For example, the sender could disallow retrieving funds from the dedicated address (sender's box) until a certain time in the future, from a specific geographic location or based on attestations that an off-chain event has occurred.

d) To allow the link to be transmitted using any means chosen by the link creator (e.g. SMS message, email, handwritten on paper or printout, QR code, Apple/Google Wallet type digital storage tools, etc.).

e) To allow the unique link holder to claim the value and transfer the underlying funds to a destination account which is automatically created upon execution of the link. The unique link structure allows for one user to pass value from their underlying account to a secondary account without the need for the next recipient to have an existing wallet; instead, the box of the recipient is created upon the execution of the link.

At the time of attempted redemption, the aforementioned embedded proof-of-credential rules can be used to determine whether or not the transfer is valid and will complete the transfer of funds only if the attempted transfer satisfies the transfer validation rules. The transactions according to embodiments of the present invention are atomic. The validations include, but are not limited to basic password authentication, geo-position matching, two and three-factor verification schemes, restriction on time of transfer, and third party platform powered social verification methods.

This rule- and computer program code-based ability to create a link that authorizes the transfer of value without needing to define the recipient, and then the eventual recipient having the ability to redeem or "cash a link" improves the functionality of existing blockchain networks. In particular, the unique structure of the link and the interaction with the computer programs in the blockchain network, allows for tokens or value to be stored and transferred from one address or box to another automatically.

The recipient of the link may redeem the tokens or value, or pass the link to another recipient without redeeming the underlying tokens or value. The blockchain-based sender's box may be configured by the sender to only allow withdrawal of funds under certain conditions. When a recipient redeems the tokens or value, the recipient uses the cryptographic signature in the link to initiate the transfer of value from the sender's box to a new blockchain address (recipient's box) that is created by execution of the link.

Parameters are stored in a blockchain smartcontract that configures the usage of the link. In particular, the computer program code thereof enables additional capabilities for the payment and sender that are not available with default blockchain cryptocurrency or token transfers. The parameters that are set for the link allow for any number of restrictions to be put in place that control the validity of the link. For example, this could include link parameters to control link validity time expiration, required geopositioning of the link claimant at the time of opening the link, etc. The following are further conditions which could be placed on the link redemption according to embodiments of the present invention:

1. 24-hour link without secure confirmation code: User 1 creates a payment link with a set value, and a 24 hour automatic expiration time. User 1 shares this link using their own means with User 2. Within 24 hours, User 2 may open and claim this link by authenticating, at which point the transfer from User 1 to User 2 is automatically confirmed without any additional confirmation from User 1.

2. 24-hour link with secure confirmation code: User 1 creates a payment link with a set value, and a default expiration of 24 hours. User 1 sends this link using their own means to User 2. When User 2 opens this link, and claims it by authenticating, a verification code is generated and shown to both User 1 and User 2 on their respective devices. Upon visual verification of the code, User 1 confirms the payment and completes the transfer.

3. Non-expiring link, without secure confirmation code, with no account required to use: User 1 creates a payment link with a set value, and no expiration time. User 1 shares this link using their own means with User 2. At any time, User 2 may open and claim this link by authenticating, at which point the transfer from User 1 to User 2 is automatically confirmed without any additional confirmation from User 1. This link could be passed from one user to another without the need for a new user to create a new account, but the value would still be passed from one user to another.

4. Non-expiring link, with secure confirmation code: User 1 creates a payment link with a set value, and no expiration time. User 1 shares this link using their own means with User 2. When User 2 opens this link, and claims it by authenticating, a verification code is generated and shown to both User 1 and User 2 on their respective devices. Upon visual verification of the code, User 1 confirms the payment and completes the transfer.

5. Non-expiring link and parameter validated: User 1 creates a payment link with a set value, and no expiration time. User 1 shares this link using their own means with User 2. When User 2 opens the link, and claims it by authenticating, proof-of-credential checks are implemented before payment confirmation can complete the transfer. Examples of proof-of-credential are, for example: a. Proof of geographic location; b. Proof of good standing such as anti-money laundering or know your customer verification (AML/KYC); c. Proof of citizenship; d. Proof of membership in an organization (e.g., being a fiduciary of a specific company); e. Proof of good standing in a network based on querying a decentralized reputation scheme; or f. The RFC 7070 standard or an on-chain AML/KYC verification associated with the receiving blockchain wallet address.

6. Other conditions on transfer: The funds cannot be transferred unless certain conditions are met (e.g., there must be proof that the user has performed 200 hours of community service as proved by an on-chain verification method). When User 2 opens the link before expiration time, and claims it by authenticating, external proof-of-credential checks are implemented before payment confirmation can complete the transfer.

The following is an example and breakdown of the unique link structure and use according to an embodiment of the present invention:

---
https://gold.waly.cash/accept?
sm=0x49a43b8ce303854cdf162e8cd2d4ce864be78e03e753bc9b6b5c43f9ba8013d917dcf9181047351575d1fba837c96b6d6e574a40e3336b3e6b9d5a13b20a45ed1c
&owner=0x870Fc676643EFf0EF0E0add52BB129bFe08DD4C9
&index=50
&nonce=0
&claim=true

---

In this example, the purpose of the parameters is shown in Table 2 below as follows:

TABLE 2

| URL Parameter Example | Purpose |
| --- | --- |
| sm | Signature of the Keccak hash of the owner address, nonce of the code, and index of the code. Used to verify permission. |

TABLE 2-continued

| URL Parameter Example | Purpose |
|---|---|
| owner | Address of the sender. |
| index | Index of the code. |
| nonce | Nonce of the sender's box. A unique identifier for the link. The nonce can only be used once for these parameters. This avoids replay attacks and makes the cryptographic hash of the parameters a unique value. |
| claim | Boolean: Whether or not to instantly claim the code. |

When all of these parameters are supplied to the computer programs in the blockchain network to claim the underlying tokens or value, the following steps occur as an atomic operation:
1. A blockchain smart contract function computes the cryptographic hash of the sender address, nonce and index value using the Keccak hash function.
2. The cryptographic hash computed in step 1 and the signed code are used to cryptographically recover the unique blockchain address that signed the hash. This function is also referred to as ecRecover and is available for elliptic curve cryptographic signing functions such as for secp256k1.
3. A claimer signs a new blockchain transaction using their blockchain wallet address. The recovered sender address from step 2 is compared to the sender stored in the blockchain smartcontract memory (the computer program code and memory) for the unique cryptographic hash. If the sender matches the signed code recovered address then the values for {token, amount} and {token2, amount2} are transferred to the claimer's blockchain address. After a claimer receives the value they can immediately generate a new URL and transfer the same value to a new recipient.

In an embodiment, the present invention provides for sending blockchain- and URL-based sending of value Packages. The combination of underlying value with multiple blockchain token types and NFTs can have a persistent identity that allows packaging of multiple value types to be transferred together. For example a USDC token, a PAXG token and the NFT representing complete ownership of a painting could be bundled together. After owner A sends the package of value to recipient B, recipient B can send the whole package of USDC, PAXG and the NFT artwork to recipient C as a package with its own identity.

In contrast to embodiments of the present invention, the existing methods to send links (URLs) all require the recipient to be defined at the time of payment, and do not allow for custom permissions on the validity of the payment to be governed by a pre-specified set of rules. This represents improvements to the functionality of the blockchain network and the user devices and computing nodes participating in the blockchain network, as well as technological improvements on cryptographically signed transfers as used on a blockchain, and secured blockchain boxes due to the fact that users do not need to create an account nor designate a recipient to pass along tokens or value.

Embodiments of the present invention apply to storage and transfer of any type of cryptocurrency, tokens, or other value (points system, video game virtual currencies) that could be attached to links that could be redeemed, either in an unrestricted manner or if only if certain rules can be met. Value could also be attached in the form of an NFT, a special type of cryptographic token which represents something unique. NFTs are described in the Ethereum standard protocol ERC-721 which describes NFTs in this way: A Non-Fungible Tokens (NFT) is used to identify something or someone in a unique way. This type of Token is perfect to be used on platforms that offer collectible items, access keys, lottery tickets, numbered seats for concerts and sports matches, etc.

Figure 4:
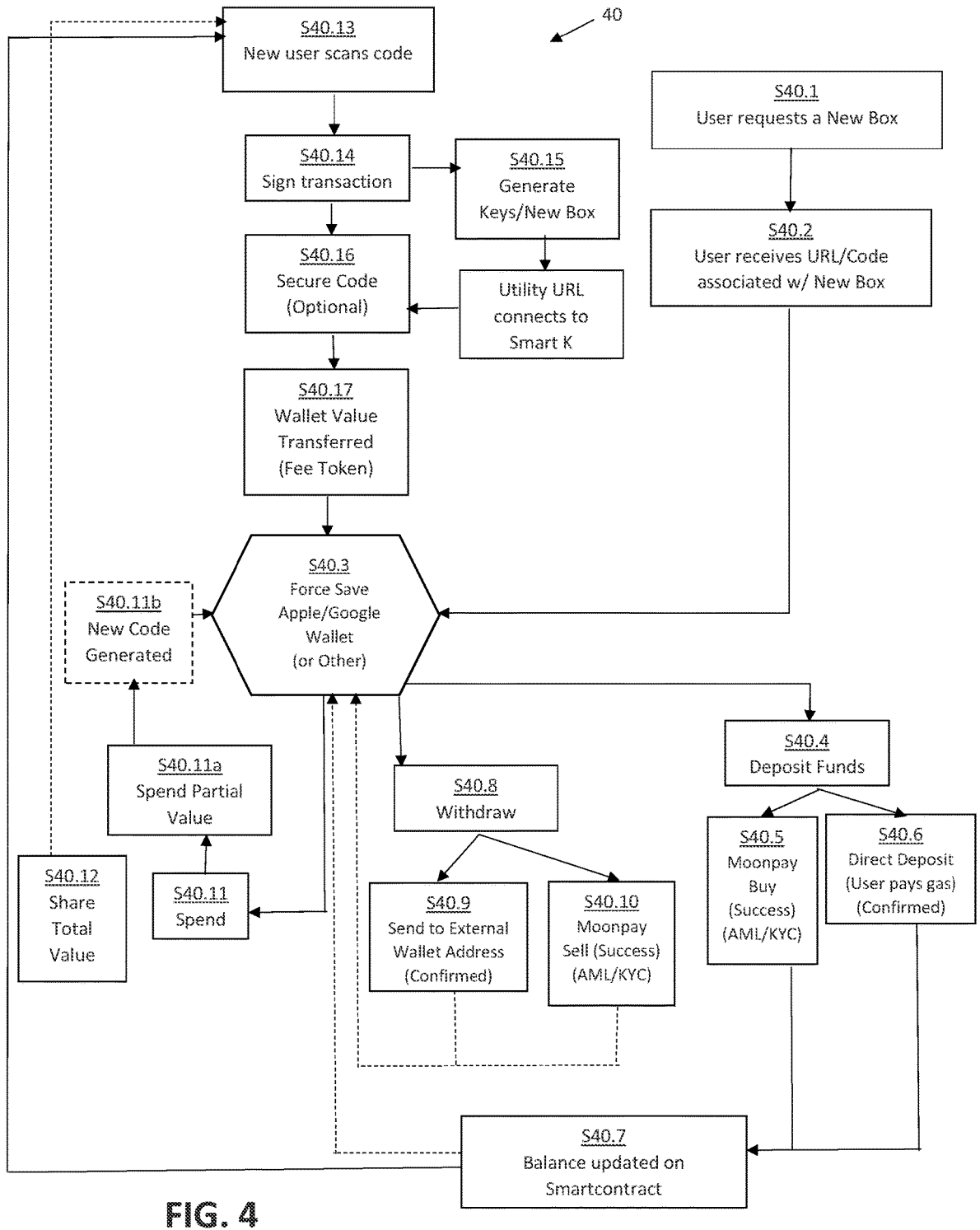
FIG. 4 is a flowchart illustrating the steps of a method for URL creation and redemption according to an embodiment of the present invention.

FIG. 4 illustrates a computerized method 40 for link/code creation and redemption according to an embodiment of the present invention. At step S40.1, a user requests to create a new box, and at step S40.2 receives a URL or QR code representing a URL associated with the new box. At step S40.3, the user is prompted by the web browser of its device to store the key parameters contained in the URL and/or the URL itself. At this point, the user can deposit funds in the new box at step S40.4 (e.g., using a utility at step S40.5 or directly at step S40.6), and the balance is updated in the smartcontracts at step S40.7. If there is already tokens or values in a box associated with a URL, there would be further options to withdraw at step S40.8 (e.g., to send to an external wallet address in step S40.9 or using a utility at step S40.10), to spend at step S40.11 or to send the total value to a recipient at step S40.12. If the user chooses to only spend part of the value at step S40.11a, a new QR code is generated for the remaining value in the account at step S40.11b. Upon the scanning of any QR code at step S40.13, the transaction is signed using the sender's key contained in the URL at step S40.14 and key parameters and a new box for the recipient is created at step S40.15, and the recipient user's device saves the key parameters and/or a new URL containing those key parameters at step S40.3. The recipient can secure any new QR code created for the new URL at step S40.16. The value is then transferred the recipient's new box at step S40.17

Figure 5:
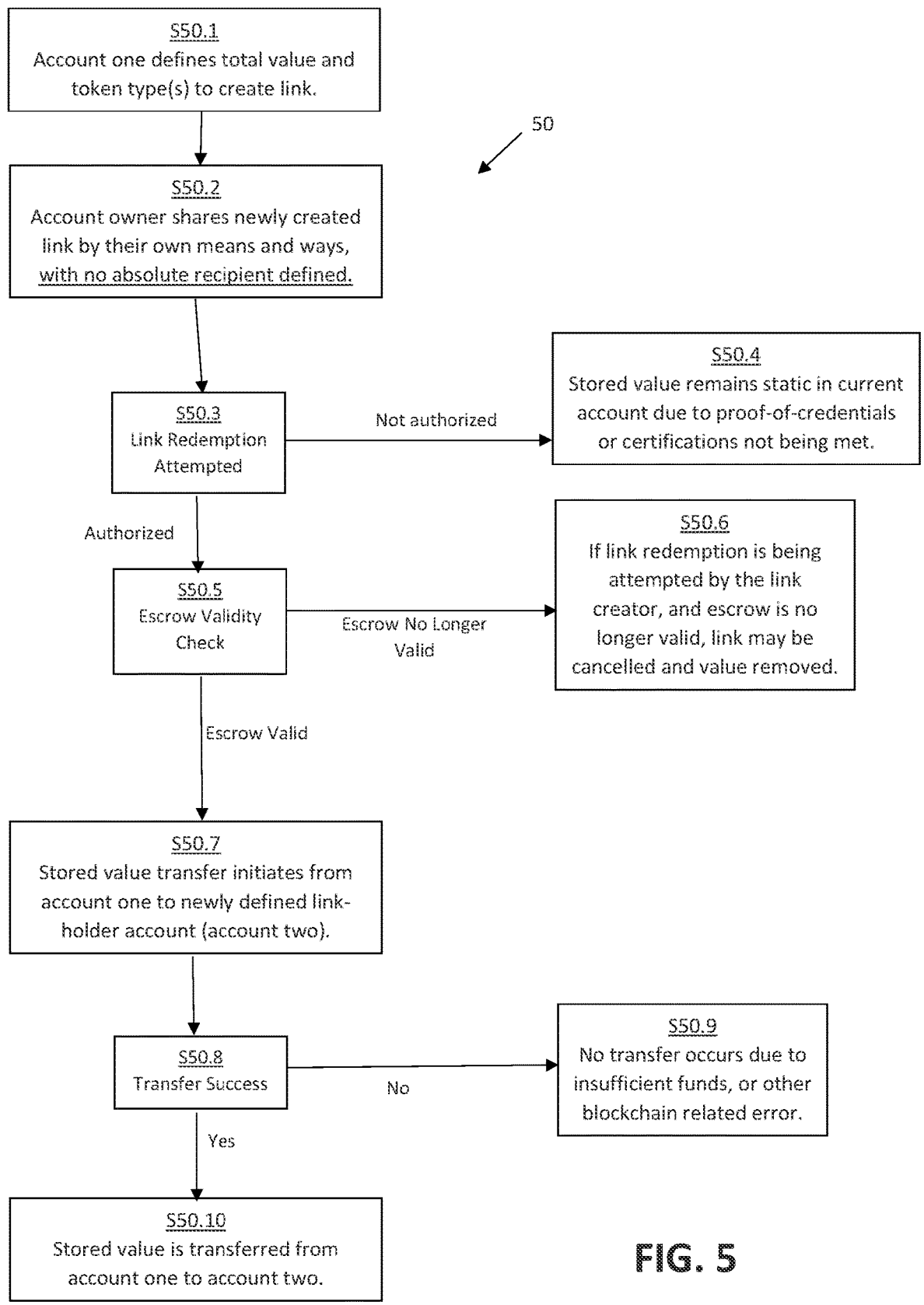
FIG. 5 is a flowchart illustrating the steps of a method for transferring value by a uniquely generated URL according to an embodiment of the present invention.

FIG. 5 illustrates a computerized method 50 for link/code creation and redemption according to an embodiment of the present invention. At step S50.1, a sending user, who does not have to have an existing blockchain wallet address, reserves an address on the blockchain network, deposits value to that address and generates a URL containing a private key of the sending user and a public key associated with the address. As mentioned, this URL is preferably represented by a QR code. At step S50.2, the sending user, now being an account holder shares the link with any recipient, as the recipient advantageously does not need to be defined and is not required to have a pre-existing account on the blockchain network. At step S50.3, a recipient executed the URL to try to claim the value. At this point, a proof-of-credential or other check of claim conditions could be carried out. If the recipient is not authorized, the stored value remains in the sender's box at step S50.4. If authorized, it can be checked at step S50.5 whether the link is still valid (e.g., it was executed by the sending user or a time validity has expired), and if not the link can be canceled or the value can be returned to a different account of the sending user, or remain in the sender's box at step S50.6. Provided the checks are successful, the tokens or value are moved from the sender's box to a box created for the user upon execution of the URL at step S50.7. Since it is an atomic operation, if an error occurs, such as insufficient funds at the time of the URL execution, the transfer will fail at step S50.9. Conversely, if all conditions were met and there are sufficient funds at the check at step S50.8, the transfer will occur and the blockchain network will reach consensus on it at step S50.10.

Embodiments of the present invention also provide for transferring partial values and dispensary codes. For these embodiments, the method according to any embodiment described above can be used. In the embodiments described above, the claim key is preferably a one-time use code for each individual transfer, whereas for a code for partial transfers or a dispensary code, the same code could be used for multiple transfers. In these embodiments, one or more additional computer programs are used to control the new dispensary box or address associated with the dispensary. In order to prevent a same user from claiming multiple times from the same code, a redirect URL can be used to check if the user has already claimed the code.

Figure 6:
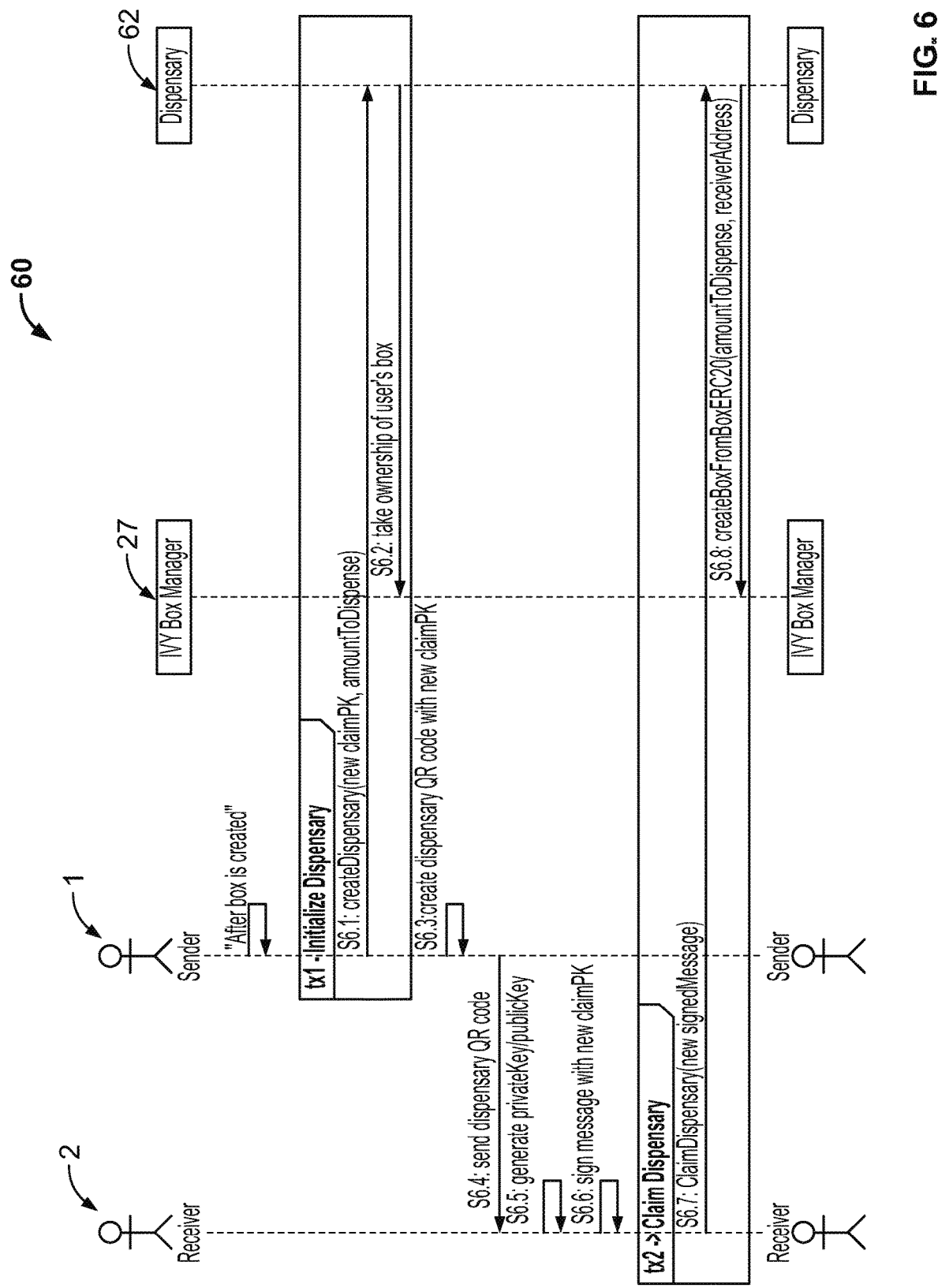
FIG. 6 is a UML diagram showing the calls and interaction among the computer programs for a first protocol for providing a dispensary code according to an embodiment of the present invention.

FIG. 6 shows a first protocol 60 for generating and providing for claiming from a dispensary code. First, a sender's box is created as in other embodiments. After the box is created, in step S6.1, the sending user 1 or the Utility URL sends a transaction tx1 to initialize the new box to be a dispensary for multiple transfers to the dispensary computer program 62, which is a smartcontract implemented on the blockchain network. In particular, the dispensary computer program 62 is informed of the new claimPK associated with the new box and an amount to dispense from the new box each time the QR code associated with the new box is scanned. In step S6.2, the dispensary computer program 62 takes ownership of the sender's box by associating a private key of the dispensary to the new box rather than the sending user's private key. In step S6.3, the QR code can be generated, e.g., by the sending user 1, in the same manner as other embodiments except using the new claimPK associated with the new box to be contained in the URL. In step S6.4, the dispensary QR code is shared with one or preferably more than one recipient user 2. Each time a recipient user 2 scans the dispensary QR code, a private and public key pair is generated in the same manner as other embodiments in step S6.5, and the new claimPK is also extracted and used to sign a message upon execution of the URL as in other embodiments in step S6.6. The execution of the URL also triggers a transaction tx2, in particular the sending of a signed transaction including the signed message as in other embodiments, except here the signed transaction is sent to the Dispensary computer program 62, which is stored on the blockchain network, in step S6.7. In step S6.8, the dispensary computer program 62 requests the IVYBoxManager computer program 27 to create a new box using the public key of the respective recipient user 2 as the receiver address (or receiver's box) and to dispense a certain amount from the dispensary box to the receiver's box.

Figure 7:
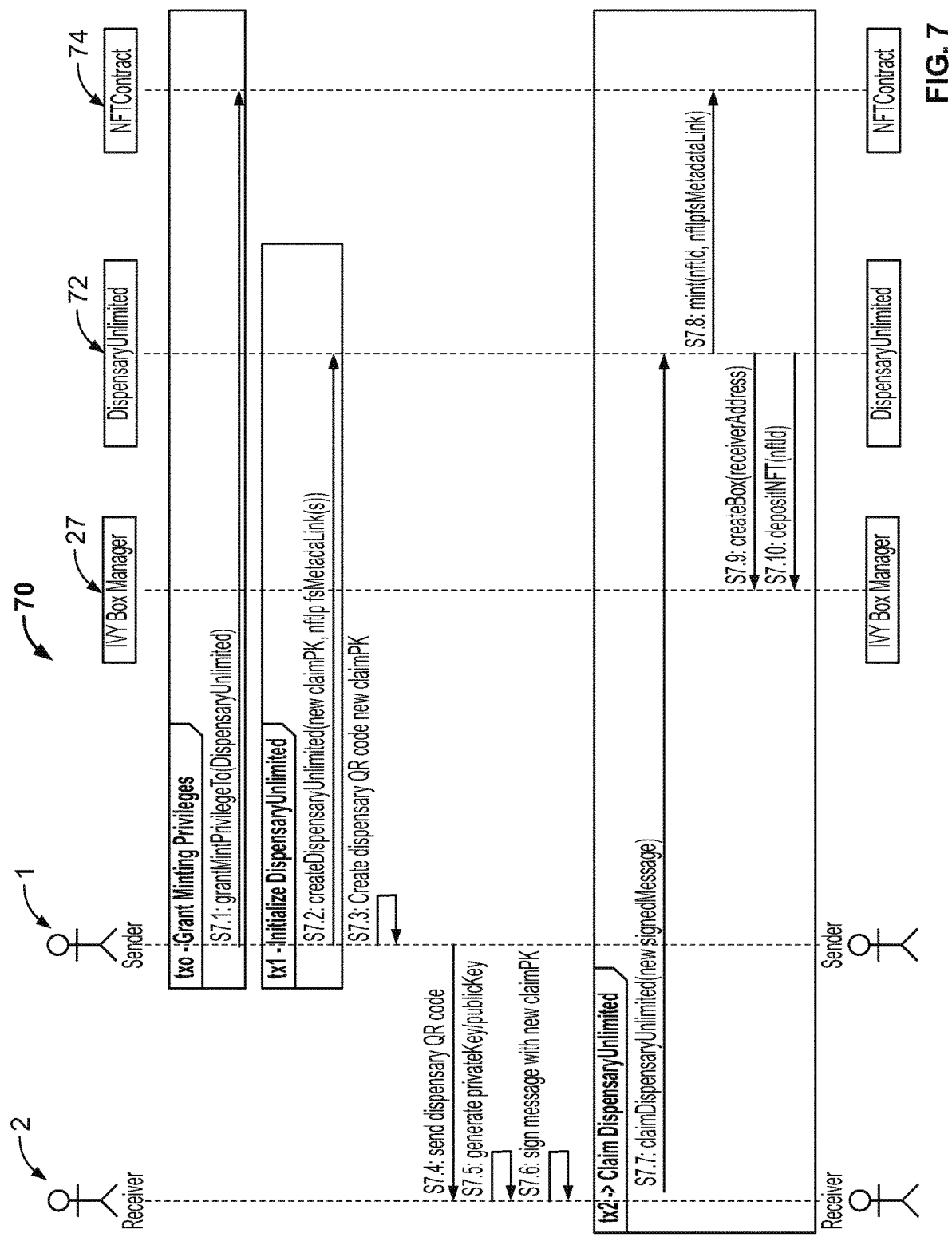
FIG. 7 is a UML diagram showing the calls and interaction among the computer programs for a second protocol for providing a dispensary code according to an embodiment of the present invention.

FIG. 7 shows a second protocol 70 for generating and providing for claiming from a dispensary code. In a step S7.1, the user that wants to create the dispensary code (in this example, the sending user 1) issues a transaction tx0 to grant NFT minting privileges to an NFTContract computer program 74 stored on the blockchain network, e.g., by granting privileges to mint NFTs. In a step S7.2, the sending user 1 issues another transaction tx1 to the DispensaryUnlimited computer program 72 which is stored on the blockchain network containing the claimPK (or ClaimKey) that is the index of the address created for the new dispensary box along with a link(s) to the NFT file(s) (e.g., file locations of images to mint as new NFTs, indicated in FIG. 7 as nftIpfsMetadataLink(s)). Accordingly, the DispensaryUnlimited computer program 72 is now the owner and is configured to mint the NFTs for the new dispensary box by interacting with the NFTContract computer program 74 later in step S7.8, with there being a unique identifier nftId generated for each minted token. In step S7.3, a new QR code is generated for the URL containing the new claimPK of the new dispensary box, e.g., by the sending user 1 and sent to the recipient user 2 in step S7.4, in the same manner as generating the QR code in other embodiments. In steps S7.5 and 7.6, the device of a user that scans the dispensary QR code (in this example, the recipient user 2) executes of the URL and thereby generates the key parameters for a new receiver's box and produces a signed message that is signed using the new claimPK contained in the URL in the same manner as in other embodiments. The execution of the URL also triggers a transaction tx2, in particular the sending of a signed transaction including the signed message as in other embodiments, except here the signed transaction is sent to the DispensaryUnlimited computer program 72 in step S7.7, which triggers the minting of a new token with a generated identifier nftId in step S7.8. Once the new token has been minted, the DispensaryUnlimited computer program 72 creates a new box for it in the same manner as creating a box in other embodiments in step S7.9, and deposits the new token in the new box in step S7.10. Each time a different user scans the same dispensary QR code created in step S7.3, steps S7.5 to S7.10 are repeated. Although this example refers to NFTs, the same procedure could be followed to mint other tokens or value.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for performing a transfer using a blockchain network and a uniform resource locator (URL), the method comprising:
receiving, by computer program code which is stored on the blockchain network, an address on the blockchain network and tokens or value associated with the address for writing a blockchain transaction using the computer program code, wherein the URL is associated with the address and includes key parameters of the address;
receiving, by the computer program code as an automated result of execution of the URL, a cryptographically signed transaction having the key parameters of the address and key parameters of a new address on the blockchain network that were generated by the execution of the URL to which at least part of the tokens or value is to be sent; and transferring, by the computer program code and based on the blockchain network reaching consensus on the cryptographically signed transaction, the at least part of the tokens or value from the address to the new address as a further automated result of the execution of the URL.

2. The method according to claim 1, wherein the computer program code calculates an amount of costs or fees required for the transfer, and sends the costs or fees from the tokens or value to corresponding accounts prior to performing the blockchain transaction that associates the remaining tokens or values to the address.

3. The method according to claim 2, wherein the costs or fees include a gas fee, and wherein the computer program code connects to a utility for obtaining an amount of the gas fees and a gas station network for exchanging part of the tokens or value to cover the gas fee.

4. The method according to claim 1, wherein the URL is associated with a Quick Response (QR) code, and is executed by a device having a web browser by scanning the QR code.

5. The method according to claim 4, wherein a private key of the key parameters that were generated by execution of the URL is used to sign the transaction and remains on the device having the web browser that executes the URL.

6. The method according to claim 1, further comprising generating a new URL containing the key parameters of the new address and being associated with the new address upon the execution of the URL.

7. The method according to claim 6, further comprising, receiving, by the computer program code upon execution of the new URL, a further cryptographically signed transaction having the key parameters of the new address and key parameters of a further new address on the blockchain network that were generated by the execution of the new URL to which the tokens or value is to be sent, and transferring, by the computer program code and based on the blockchain network reaching consensus on the further cryptographically signed transaction, the tokens or value from the address to the new address as an automated result of the execution of the new URL.

8. The method according to claim 1, wherein the computer program code connects to a decentralized exchange and/or another computer program implemented in the blockchain network to wrap and/or unwrap the tokens or value, and/or to exchange for other tokens or value, prior to performing the blockchain transaction that associates the tokens or values to the address and/or prior to transferring the at least part of the tokens or value to the new address.

9. The method according to claim 1, further comprising receiving a condition for the transfer, and checking whether the condition has been met prior to transferring the tokens or values to the new address.

10. The method according to claim 9, wherein the condition is a proof-of-credential and/or a validity time limit on the URL.

11. The method according to claim 1, wherein the URL is linked to computer code which is sent to the device of a user that executed the URL such that the device generates and locally stores the key parameters of the new address, generates a signed message using a private key of the key parameters of the address contained in the URL, generates a signed transaction containing the signed message using a private key of the key parameters of the new address and sends the signed transaction to the computer program code for making the transfer.

12. The method according to claim 1, further comprising receiving, by the computer program code, a transaction including key parameters of an address to serve as a dispensary and an amount to transfer from the dispensary upon each execution of the URL, whereby a new address is created using key parameters of a device that executed the URL upon each execution, wherein the amount to transfer is transferred in each case to the new address, and wherein the new addresses are different from each other.

13. The method according to claim 1, further comprising receiving, by the computer program code, a transaction including key parameters of an address to serve as a dispensary that is associated with one or more links to mintable tokens, whereby a new address is created using key parameters of a device that executed the URL upon each execution, wherein the computer program code is configured to mint the tokens at the links in each case with a different identifier each time the URL is executed and transfer the minted token in each case to the new address, and wherein the new addresses are different from each other.

14. A system for performing a transfer using a blockchain network and a uniform resource locator (URL), the system comprising one or more hardware processors configured by computer program code which is stored on the blockchain network to:
receive an address on the blockchain network and tokens or value associated with the address for writing a blockchain transaction, wherein the URL is associated with the address and includes key parameters of the address;
receive, as an automated result of execution of the URL, a cryptographically signed transaction having the key parameters of the address and key parameters of a new address on the blockchain network that were generated by the execution of the URL to which at least part of the tokens or value is to be sent; and
transfer, based on the blockchain network reaching consensus on the cryptographically signed transaction, the at least part of the tokens or value from the address to the new address as a further automated result of the execution of the URL.

15. A tangible, non-transitory computer-readable medium having computer program code that is available in a blockchain network and which, upon being executed by one or more processors, provides for execution of the following steps:
receiving an address on the blockchain network and tokens or value associated with the address for writing a blockchain transaction, wherein the URL is associated with the address and includes key parameters of the address;
receiving, as an automated result of execution of the URL, a cryptographically signed transaction having the key parameters of the address and key parameters of a new address on the blockchain network that were generated by the execution of the URL to which at least part of the tokens or value is to be sent; and
transferring, based on the blockchain network reaching consensus on the cryptographically signed transaction, the at least part of the tokens or value from the address to the new address as a further automated result of the execution of the URL.

* * * * *